United States Patent
Kim et al.

(10) Patent No.: US 11,696,178 B2
(45) Date of Patent: Jul. 4, 2023

(54) APPARATUS AND METHOD FOR REDUCING OVERHEAD OF SIGNALING FIELD IN PHYSICAL LAYER CONVERGENCE PROTOCOL IN WIRELESS LOCAL AREA NETWORK SYSTEM

(71) Applicant: SAMSUNG ELECTRONICS CO., LTD., Suwon-si (KR)

(72) Inventors: Myeongjin Kim, Seongnam-si (KR); Wookbong Lee, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 28 days.

(21) Appl. No.: 17/326,644

(22) Filed: May 21, 2021

(65) Prior Publication Data
US 2021/0368390 A1    Nov. 25, 2021

Related U.S. Application Data

(60) Provisional application No. 63/031,659, filed on May 29, 2020, provisional application No. 63/029,641, filed on May 25, 2020.

(30) Foreign Application Priority Data

Dec. 2, 2020    (KR) .................. 10-2020-0166963

(51) Int. Cl.
*H04W 28/06*    (2009.01)
*H04W 84/12*    (2009.01)
(Continued)

(52) U.S. Cl.
CPC .......... *H04W 28/06* (2013.01); *H04B 7/0452* (2013.01); *H04W 72/0453* (2013.01); *H04W 72/52* (2023.01); *H04W 84/12* (2013.01)

(58) Field of Classification Search
CPC .. H04W 28/06; H04W 72/0453; H04W 84/12
(Continued)

(56) References Cited

U.S. PATENT DOCUMENTS 9,722,740 B2    8/2017    Suh et al.
10,200,228 B2    2/2019    Wu et al.
(Continued)

FOREIGN PATENT DOCUMENTS

KR    10-2017-0016978    2/2017
WO    2017030404    2/2017

OTHER PUBLICATIONS

Kim, et al., "RU Allocation Subfield Design for Multi-RU Support", 17 pages.
(Continued)

*Primary Examiner* — Angel T Brockman
(74) *Attorney, Agent, or Firm* — F. Chau & Associates, LLC

(57) ABSTRACT

A baseband circuit in a transmitting device of a WLAN may include at least one processor configured to generate a PPDU comprising a preamble and a payload. The preamble includes training fields and signaling fields, and the payload includes a data field. A first one of the signaling fields includes a compression mode field indicating whether resource unit (RU) allocation information designated for at least one receiving device is included in a second one of the signaling fields. A binary value of the compression mode field represents whether the RU allocation information is included and size information associated with the RU allocated to the at least one receiving device.

21 Claims, 30 Drawing Sheets

(51) Int. Cl.
  *H04W 72/52*   (2023.01)
  *H04W 72/0453* (2023.01)
  *H04B 7/0452*  (2017.01)

(58) Field of Classification Search
  USPC .......................................................... 370/230
  See application file for complete search history.

(56) References Cited

U.S. PATENT DOCUMENTS

| | | |
|---|---|---|
| 10,218,553 B2 | 2/2019 | Seok |
| 10,263,821 B2 | 4/2019 | Lee et al. |
| 10,306,667 B2 | 5/2019 | Kim et al. |
| 10,616,017 B2 | 4/2020 | Liu et al. |
| 2016/0057657 A1 | 2/2016 | Seok |
| 2016/0113009 A1 | 4/2016 | Seok |
| 2017/0048844 A1* | 2/2017 | Chen ................. H04W 72/0413 |

OTHER PUBLICATIONS

Au, "Compendium of straw polls and potential changes to the Specification Framework Document", 79 pages.

\* cited by examiner

FIG. 7

| Subfield | Number of subfield | Number of bits per subfield | Description |
|---|---|---|---|
| RU Allocation | N | 8 | N RU Allocation subfields are present in an HE-SIG-B content channel, where:<br>N = 1 if the Bandwidth field in the HE-SIG-A field is 0 or 1 (indicating a 20 MHz or 40 MHz HE MU PPDU)<br>N = 2 if the Bandwidth field in the HE-SIG-A field is 2, 4, or 5 (indicating an 80 MHz HE MU PPDU)<br>N = 4 if the Bandwidth field in the HE-SIG-A field is 3, 6, or 7 (indicates a 160 MHz or 80+80 MHz HE MU PPDU)<br><br>Each RU Allocation subfield in an HE-SIG-B content channel corresponding to a 20 MHz frequency segment indicates the RU assignment, including the size of the RU(s) and their placement in the frequency domain, to be used in the HE modulated fields of the HE MU PPDU in the frequency domain, also indicates information needed to compute the number of users allocated to each RU. where the subcarrier indices of the RU(s) meet the conditions in Table 27-25 (RUs associated with each RU Allocation subfield for each HE-SIG-B content channel and PPDU bandwidth). |
| Center 26-tone RU | 0 or 1 | 1 | The Center 26-tone RU field is present if the Bandwidth field in the HE-SIG-A field indicates a bandwidth greater than 40 MHz and not present otherwise.<br><br>If the Bandwidth field in the HE-SIG-A field is 2, 4 or 5 (Indicating 80 MHz):<br>    Set to 1 to indicate that a user is allocated to the center 26-tone RU (See Figure 27-7 (RU locations in an 80 MHz HE PPDU)) and that its User field is present in HE-SIG-B content channel 1; otherwise, set to 0. The same value is applied to both HE-SIG-B content channels.<br><br>If the Bandwidth field in the HE-SIG-A field is 3, 6 or 7 (indicating 160 MHz or 80+80 MHz):<br>    For HE-SIG-B content channel 1, set to 1 to indicate that a user is allocated to the center 26-tone RU of the lower frequency 80 MHz; otherwise, set to 0;<br>    For HE-SIG-B content channel 2, set to 1 to indicate that a user is allocated to the center 26-tone RU of the higher frequency 80 MHz; otherwise, set to 0. |
| CRC | 1 | 4 | The CRC is calculated over bits 0 to N × 8 if the Bandwidth field in the HE-SIG-A field indicates a bandwidth greater than 40 MHz, and bits 0 to N × 8 − 1, otherwise. See 27.3.11.7.3 (CRC computation). |
| Tail | 1 | 6 | Used to terminate the trellis of the convolutional decoder. Set to 0 |

FIG. 8

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 0 (00000000) | 26 | 26 | 26 | 26 | 26 | 26 | 26 | 26 | 26 | 1 |
| 1 (00000001) | 26 | 26 | 26 | 26 | 26 | 26 | 26 | 52 | | 1 |
| 2 (00000010) | 26 | 26 | 26 | 26 | 26 | 52 | | 26 | 26 | 1 |
| 3 (00000011) | 26 | 26 | 26 | 26 | 26 | 52 | | 52 | | 1 |
| 4 (00000100) | 26 | 26 | 52 | | 26 | 26 | 26 | 26 | 26 | 1 |
| 5 (00000101) | 26 | 26 | 52 | | 26 | 26 | 26 | 52 | | 1 |
| 6 (00000110) | 26 | 26 | 52 | | 26 | 52 | | 26 | 26 | 1 |
| 7 (00000111) | 26 | 26 | 52 | | 26 | 52 | | 52 | | 1 |
| 8 (00001000) | 52 | | 26 | 26 | 26 | 26 | 26 | 26 | 26 | 1 |
| 9 (00001001) | 52 | | 26 | 26 | 26 | 26 | 26 | 52 | | 1 |
| 10 (00001010) | 52 | | 26 | 26 | 26 | 52 | | 26 | 26 | 1 |
| 11 (00001011) | 52 | | 26 | 26 | 26 | 52 | | 52 | | 1 |
| ⋮ | | | | | | | | | | |
| 96-111 (0110$y_1 y_0 z_1 z_0$) | 106 | | | | - | | 106 | | | 16 |
| 112 (01110000) | 52 | | 52 | | - | 52 | | 52 | | 1 |
| 113 (01110001) | 242-tone RU empty (with zero users) | | | | | | | | | 1 |
| 114 (01110010) | 484-tone RU: contributes zero User fields to the User Specific field in the same HE-SIG-B content channel as this RU Allocation subfield | | | | | | | | | 1 |
| 115 (01110011) | 996-tone RU: contributes zero User fields to the User Specific field in the same HE-SIG-B content channel as this RU Allocation subfield | | | | | | | | | 1 |
| 116-119 (011101$x_1 x_0$) | Reserved | | | | | | | | | 4 |
| 120-127 (01111$y_2 y_1 y_0$) | Reserved | | | | | | | | | 8 |
| 128-191 (10$y_2 y_1 y_0 z_2 z_1 z_0$) | 106 | | | | 26 | | 106 | | | 64 |
| 192-199 (11000$y_2 y_1 y_0$) | 242 | | | | | | | | | 8 |
| 200-207 (11001$y_2 y_1 y_0$) | 484 | | | | | | | | | 8 |
| 208-215 (11010$y_2 y_1 y_0$) | 996 | | | | | | | | | 8 |
| 216-223 (11011$y_2 y_1 y_0$) | Reserved | | | | | | | | | 8 |
| 224-255 (111$x_4 x_3 x_2 x_1 x_0$) | Reserved | | | | | | | | | 32 |

FIG. 9

| Two Parts of HE-SIG-A | Bit | Field | Number of bits | Description |
|---|---|---|---|---|
| | B15-B17 | Bandwidth | 3 | Set to 0 for 20 MHz.<br>Set to 1 for 40 MHz.<br>Set to 2 for 80 MHz non-preamble puncturing mode.<br>Set to 3 for 160 MHz and 80+80 MHz non-preamble puncturing mode.<br><br>If the HE-SIG-B Compression field is 0:<br>    Set to 4 for preamble puncturing in 80 MHz, where in the preamble only the secondary 20 MHz is punctured.<br>    Set to 5 for preamble puncturing in 80 MHz, where in the preamble only one of the two 20 MHz subchannels in secondary 40 MHz is punctured.<br>    Set to 6 for preamble puncturing in 160 MHz or 80+80 MHz, where in the primary 80 MHz of the preamble only the secondary 20 MHz is punctured.<br>    Set to 7 for preamble puncturing in 160 MHz or 80+80 MHz, where in the primary 80 MHz of the preamble the primary 40 MHz is present, and at least one 20 MHz subchannel that is not in the primary 40 MHz is punctured.<br><br>If the HE-SIG-B Compression field is 1 then values 4-7 are reserved. |
| | B18-B21 | Number Of HE-SIG-B Symbols Or MU-MIMO Users | 4 | If the HE-SIG-B Compression field is 0, indicates the number of OFDM symbols in the HE-SIG-B field:<br>    Set to the number of OFDM symbols in the HE-SIG-B field minus 1 if the number of OFDM symbols in the HE-SIG-B field is less than 16;<br>    Set to 15 to indicate that the number of OFDM symbols in the HE-SIG-B field is equal to 16 if Longer Than 16 HE-SIG-B OFDM Symbols Support subfield of the HE Capabilities element transmitted by at least one recipient STA is 0;<br>    Set to 15 to indicate that the number of OFDM symbols in the HE-SIG-B field is greater than or equal to 16 if the Longer Than 16 HE-SIG-B OFDM Symbols Support subfield of the HE Capabilities element transmitted by all the recipient STAs are 1 and if the HE-SIG-B-MCS field is set to 0, 1, 2, or 3 regardless of the value of the HE-SIG-B DCM field, or the HE-SIG-B-MCS field is set to 4 and the HE-SIG-B DCM field is set to 1. The exact number of OFDM symbols in the HE-SIG-B field is calculated based on the number of User fields in the HE-SIG-B content channel, which is indicated by HE-SIG-B Common field in this case.<br><br>If the HE-SIG-B Compression field is 1, indicates the number of MU-MIMO users and is set to the number of MU-MIMO users minus 1. |
| | B22 | HE-SIG-B Compression | 1 | Set to 0 if the Common field in HE-SIG-B is present.<br>Set to 1 if the Common field in HE-SIG-B is not present. |

FIG. 14

| Non-OFDMA | OFDMA | |
|---|---|---|
| | RUs with size of < 242 tones (non MU-MIMO) | RUs with size of >= 242 tones (MU-MIMO and non MU-MIMO) |
| Non-OFDMA mode (compressed mode) | OFDMA mode (non-compressed mode 1) | Large-size RU OFDMA mode (non-compressed mode 2) |

FIG. 15A

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | 52 | | 26 | 26 | 26 | 26 | 26 | 1 |
| 5 | 26 | 26 | 52 | | 26 | 26 | 26 | 52 | | 1 |
| 6 | 26 | 26 | 52 | | 26 | 52 | | 26 | 26 | 1 |
| 7 | 26 | 26 | 52 | | 26 | 52 | | 52 | | 1 |
| 8 | 52 | | 26 | 26 | 26 | 26 | 26 | 26 | 26 | 1 |
| 9 | 52 | | 26 | 26 | 26 | 26 | 26 | 52 | | 1 |
| 10 | 52 | | 26 | 26 | 26 | 52 | | 26 | 26 | 1 |
| 11 | 52 | | 26 | 26 | 26 | 52 | | 52 | | 1 |
| 12 | 52 | | 52 | | 26 | 26 | 26 | 26 | 26 | 1 |
| 13 | 52 | | 52 | | 26 | 26 | 26 | 52 | | 1 |
| 14 | 52 | | 52 | | 26 | 52 | | 26 | 26 | 1 |
| 15 | 52 | | 52 | | 26 | 52 | | 52 | | 1 |
| 16-23 (00010$y_2 y_1 y_0$) | 52 | | 52 | | – | 106 | | | | 8 |
| 24-31 (00011$y_2 y_1 y_0$) | 106 | | | | – | 52 | | 52 | | 8 |
| 32-39 (00100$y_2 y_1 y_0$) | 26 | 26 | 26 | 26 | 26 | 106 | | | | 8 |
| 40-47 (00101$y_2 y_1 y_0$) | 26 | 26 | 52 | | 26 | 106 | | | | 8 |
| 48-55 (00110$y_2 y_1 y_0$) | 52 | | 26 | 26 | 26 | 106 | | | | 8 |

FIG. 15B

| | | | | | | | |
|---|---|---|---|---|---|---|---|
| 56-63 ($00111y_2y_1y_0$) | 52 | 52 | 26 | 106 | | | 8 |
| 64-71 ($01000y_2y_1y_0$) | 106 | | 26 | 26 | 26 | 26 | 26 | 8 |
| 72-79 ($01001y_2y_1y_0$) | 106 | | 26 | 26 | 26 | 52 | | 8 |
| 80-87 ($01010y_2y_1y_0$) | 106 | | 26 | 52 | | 26 | 26 | 8 |
| 88-95 ($01011y_2y_1y_0$) | 106 | | 26 | 52 | | 52 | | 8 |
| 96-111 ($0110y_1y_0z_1z_0$) | 106 | | - | 106 | | | 16 |
| 112 | 52 | 52 | - | 52 | 52 | | 1 |
| 113 | 242-tone RU empty (with zero users) | | | | | | 1 |
| 114 | 484-tone RU: contributes zero User fields to the User Specific field in the same HE-SIG-B content channel as this RU Allocation subfield | | | | | | 1 |
| 115 | 996-tone RU: contributes zero User fields to the User Specific field in the same HE-SIG-B content channel as this RU Allocation subfield | | | | | | 1 |
| 116 | 26 | 26+52 multi-RU | 26 | 26 | 26 | 26 | 26 | 1 |
| 117 | 26 | 26+52 multi-RU | 26 | 26 | 26 | 52 | | 1 |
| 118 | 26 | 26+52 multi-RU | 26 | 52 | | 26 | 26 | 1 |
| 119 | 26 | 26+52 multi-RU | 26 | 52 | | 52 | | 1 |
| 120 | 26 | 26 | 26 | 26 | 26 | 52+26 multi-RU | 26 | 1 |
| 121 | 26 | 26 | 52 | | 26 | 52+26 multi-RU | 26 | 1 |
| 122 | 52 | | 26 | 26 | 26 | 52+26 multi-RU | 26 | 1 |
| 123 | 52 | 52 | | 26 | 52+26 multi-RU | 26 | 1 |
| 124 | 26 | 26+52 multi-RU | 26 | 106 | | | 1 |
| 125 | 106 | | 26 | 52+26 multi-RU | 26 | | 1 |
| 126 | 106+26 multi-RU | | 26 | 26 | 26 | 26 | 1 |
| 127 | 106+26 multi-RU | | 26 | 26 | 52 | | 1 |

FIG. 15C

| | | | | | |
|---|---|---|---|---|---|
| 128-191 ($10y_2 y_1 y_0 z_2 z_1 z_0$) | 106 | 26 | 106 | | 64 |
| 192-199 ($11000y_2 y_1 y_0$) | 242 | | | | 8 |
| 200-207 ($11001y_2 y_1 y_0$) | 484 | | | | 8 |
| 208-215 ($11010y_2 y_1 y_0$) | 996 | | | | 8 |
| 216 | 106+26 multi-RU | | 52 | 26 | 26 | 1 |
| 217 | 106+26 multi-RU | | 52 | 52 | | 1 |
| 218 | 26 | 26 | 26 | 26 | 26+106 multi-RU | 1 |
| 219 | 26 | 26 | 52 | | 26+106 multi-RU | 1 |
| 220 | 52 | | 26 | 26 | 26+106 multi-RU | 1 |
| 221 | 52 | | 52 | | 26+106 multi-RU | 1 |
| 222 | 26 | 26+52 multi-RU | | 26+106 multi-RU | | 1 |
| 223 | 106+26 multi-RU | | 52+26 multi-RU | | 26 | 1 |
| 224 | 106+26 multi-RU | | 106 | | | 1 |
| 225 | 106 | | 26+106 multi-RU | | | 1 |
| 226 | 26 | 26+52 multi-RU | 26 | 52+26 multi-RU | 26 | 1 |
| 227-255 | Reserved | | | | | 29 |

FIG. 16A

| RU Allocation subfield (B5 B4 B3 B2 B1 B0) | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 || 1 |
| 2 | 26 | 26 | 26 | 26 | 26 | 52 || 26 | 26 | 1 |
| 3 | 26 | 26 | 26 | 26 | 26 | 52 || 52 || 1 |
| 4 | 26 | 26 | 52 || 26 | 26 | 26 | 26 | 26 | 1 |
| 5 | 26 | 26 | 52 || 26 | 26 | 26 | 52 || 1 |
| 6 | 26 | 26 | 52 || 26 | 52 || 26 | 26 | 1 |
| 7 | 26 | 26 | 52 || 26 | 52 || 52 || 1 |
| 8 | 52 || 26 | 26 | 26 | 26 | 26 | 26 | 26 | 1 |
| 9 | 52 || 26 | 26 | 26 | 26 | 26 | 52 || 1 |
| 10 | 52 || 26 | 26 | 26 | 52 || 26 | 26 | 1 |
| 11 | 52 || 26 | 26 | 26 | 52 || 52 || 1 |
| 12 | 52 || 52 || 26 | 26 | 26 | 26 | 26 | 1 |
| 13 | 52 || 52 || 26 | 26 | 26 | 52 || 1 |
| 14 | 52 || 52 || 26 | 52 || 26 | 26 | 1 |
| 15 | 52 || 52 || 26 | 52 || 52 || 1 |
| 16 | 52 || 52 || - | 106 ||| 1 |
| 17 | 106 ||| - | 52 || 52 || 1 |
| 18 | 26 | 26 | 26 | 26 | 26 | 106 |||| 1 |
| 19 | 26 | 26 | 52 || 26 | 106 |||| 1 |
| 20 | 52 || 26 | 26 | 26 | 106 |||| 1 |
| 21 | 52 || 52 || 26 | 106 |||| 1 |

FIG. 16B

| | | | | | | | | |
|---|---|---|---|---|---|---|---|---|
| 22 | | 106 | | 26 | 26 | 26 | 26 | 26 | 1 |
| 23 | | 106 | | 26 | 26 | 26 | 52 | | 1 |
| 24 | | 106 | | 26 | 52 | | 26 | 26 | 1 |
| 25 | | 106 | | 26 | 52 | | 52 | | 1 |
| 26 | | 106 | | - | 106 | | | | 1 |
| 27 | 52 | | 52 | - | 52 | | 52 | | 1 |
| 28 | 242-tone RU empty (with zero users) | | | | | | | | 1 |
| 29 | | 106 | | 26 | 106 | | | | 1 |
| 30 | 242 | | | | | | | | 1 |
| 31 | 484 | | | | | | | | 1 |
| 32 | 996 | | | | | | | | 1 |
| 33 | 26 | 26+52 multi-RU | | 26 | 26 | 26 | 26 | 26 | 1 |
| 34 | 26 | 26+52 multi-RU | | 26 | 26 | 26 | 52 | | 1 |
| 35 | 26 | 26+52 multi-RU | | 26 | 52 | | 26 | 26 | 1 |
| 36 | 26 | 26+52 multi-RU | | 26 | 52 | | 52 | | 1 |
| 37 | 26 | 26 | 26 | 26 | 26 | 52+26 multi-RU | | 26 | 1 |
| 38 | 26 | 26 | 52 | | 26 | 52+26 multi-RU | | 26 | 1 |
| 39 | | 52 | 26 | 26 | 26 | 52+26 multi-RU | | 26 | 1 |
| 40 | | 52 | 52 | | 26 | 52+26 multi-RU | | 26 | 1 |
| 41 | 26 | 26+52 multi-RU | | 26 | 106 | | | | 1 |
| 42 | | 106 | | 26 | 52+26 multi-RU | | | 26 | 1 |
| 43 | 106+26 multi-RU | | | | 26 | 26 | 26 | 26 | 1 |
| 44 | 106+26 multi-RU | | | | 26 | 26 | 52 | | 1 |
| 45 | 106+26 multi-RU | | | | 52 | | 26 | 26 | 1 |

FIG. 16C

| 46 | 106+26 multi-RU | | | | 52 | 52 | 1 |
|---|---|---|---|---|---|---|---|
| 47 | 26 | 26 | 26 | 26 | 26+106 multi-RU | | 1 |
| 48 | 26 | 26 | 52 | | 26+106 multi-RU | | 1 |
| 49 | 52 | | 26 | 26 | 26+106 multi-RU | | 1 |
| 50 | 52 | | 52 | | 26+106 multi-RU | | 1 |
| 51 | 26 | 26+52 multi-RU | | | 26+106 multi-RU | | 1 |
| 52 | 106+26 multi-RU | | | | 52+26 multi-RU | 26 | 1 |
| 53 | 106+26 multi-RU | | | | 106 | | 1 |
| 54 | 106 | | | | 26+106 multi-RU | | 1 |
| 55 | 26 | 26+52 multi-RU | | 26 | 52+26 multi-RU | 26 | 1 |
| 56-63 | Reserved | | | | | | 8 |

FIG. 17

| RU Allocation subfield (B7 B6 B5 B4 B3 B2 B1 B0) | #1 | #2 | Number of entries |
|---|---|---|---|
| 0-63 ($00y_2 y_1 y_0 z_2 z_1 z_0$) | 242 | 242 | 64 |
| 64-127 ($01y_2 y_1 y_0 z_2 z_1 z_0$) | 484 | 242 | 64 |
| 128-191 ($10y_2 y_1 y_0 z_2 z_1 z_0$) | MRU of 484+996 | 242 | 64 |
| 192-199 ($11000y_2 y_1 y_0$) | 242 | zero users | 8 |
| 200-207 ($11001y_2 y_1 y_0$) | zero users | 242 | 8 |
| 208-215 ($11010y_2 y_1 y_0$) | 484 | zero users | 8 |
| 216-223 ($11011y_2 y_1 y_0$) | MRU of 242+484 | | 8 |
| 224-231 ($11100y_2 y_1 y_0$) | MRU of 484+242 | | 8 |
| 232-239 ($11101y_2 y_1 y_0$) | 996 | | 8 |
| 240-247 ($11110y_2 y_1 y_0$) | MRU of 484+996 | zero users | 8 |
| 248 (11111000) | zero users | zero users | 1 |
| 249-255 | Reserved | | 7 |

FIG. 19B

| 80 MHz PPDU | | | | Values of RU Allocation subfields | | |
|---|---|---|---|---|---|---|
| 1 | 2 | 3 | 4 | CC1, RA1 | CC2, RA2 | |
| 242 | 242 | 242 | 242 | 0 | 0 | |
| empty | 242 | 242 | 242 | 200 | 0 | |
| 242 | empty | 242 | 242 | 0 | 200 | |
| 242 | 242 | empty | 242 | 192 | 0 | |
| 242 | 242 | 242 | empty | 0 | 192 | |
| 484 | | 484 | | 208 | 208 | |
| 484 | | 242 | 242 | 64 | 200 | |
| 484 | | empty | 242 | 208 | 200 | |
| 484 | | 242 | empty | 64 | 248 | |
| 242 | 242 | 484 | | 192 | 64 | |
| empty | 242 | 484 | | 248 | 64 | |
| 242 | empty | 484 | | 192 | 208 | |
| 242 | 242 | 484 | | 192 | 216 | MRU |
| empty | 242 | 484 | | 248 | 216 | MRU |
| 242 | 242 | 484 | | 216 | 192 | MRU |
| 242 | empty | 484 | | 216 | 248 | MRU |
| 484 | | 242 | 242 | 224 | 200 | MRU |
| 484 | | 242 | empty | 224 | 248 | MRU |
| 484 | | 242 | 242 | 200 | 224 | MRU |
| 484 | | empty | 242 | 248 | 224 | MRU |

FIG. 20

| RU size | 160 MHz | | | |
|---|---|---|---|---|
| | CC1, RA1 | CC2, RA3 | CC1(R), RA2 | CC2(R), RA4 |
| 242 | 242RU1, 242RU3 | 242RU2, 242RU4 | 242RU5, 242RU7 | 242RU6, 242RU8 |
| 484 | 484RU1+242RU3 | 242RU2+484RU2 | 484RU3+242RU7 | 242RU6+484RU4 |
| 996 | 996RU1 | 996RU2 | 996RU1 | 996RU2 |

FIG. 21B

| 160 MHz PPDU | | | | | | | | Values of RU Allocation subfields | | | |
|---|---|---|---|---|---|---|---|---|---|---|---|
| 1 | 2 | 3 | 4 | 5 | 6 | 7 | 8 | CC1, RA1 | CC2, RA3 | CC1(R), RA2 | CC2(R), RA4 |
| 242 | 242 | 242 | 242 | | | | | 0 | 0 | | |
| empty | 242 | 242 | 242 | | | | | 200 | 0 | | |
| 242 | empty | 242 | 242 | | | | | 0 | 200 | | |
| 242 | 242 | empty | 242 | | | | | 192 | 0 | | |
| 242 | 242 | 242 | empty | | | | | 0 | 192 | | |
| 484 | | 484 | | | | | | 208 | 208 | | |
| 484 | | 242 | 242 | | | | | 64 | 200 | | |
| 484 | | empty | 242 | | | | | 208 | 200 | | |
| 484 | | 242 | empty | | | | | 64 | 248 | | |
| 242 | 242 | 484 | | | | | | 192 | 64 | | |
| empty | 242 | 484 | | | | | | 248 | 64 | | |
| 242 | empty | 484 | | | | | | 192 | 208 | | |
| 242 | 242 | 484 | | | | | | 192 | 216 | | |
| empty | 242 | 484 | | | | | | 248 | 216 | | |
| 242 | 242 | 484 | | | | | | 216 | 192 | | |
| 242 | empty | 484 | | | | | | 216 | 248 | | |
| 484 | | 242 | 242 | | | | | 224 | 200 | | |
| 484 | | 242 | empty | | | | | 224 | 248 | | |
| 484 | | 242 | 242 | | | | | 200 | 224 | | |
| 484 | | empty | 242 | | | | | 248 | 224 | | |
| 996 | | | | | | | | 232 | 248 | | |

MRU

FIG. 21C

| | | | | | | | | | | | | |
|---|---|---|---|---|---|---|---|---|---|---|---|---|
| 484 | 242 | 242 | 996 | | | 128 | 200 | 248 | 248 | |
| 484 | empty | 242 | 996 | | | 240 | 200 | 248 | 248 | |
| 484 | 242 | empty | 996 | | | 129 | 248 | 248 | 248 | |
| 484 | empty | empty | 996 | | | 240 | 248 | 248 | 248 | |
| 484 | 484 | | 996 | | | 240 | 208 | 248 | 248 | |
| 242 | 242 | 484 | 996 | | | 192 | 128 | 248 | 248 | |
| empty | 242 | 484 | 996 | | | 249 | 128 | 248 | 248 | |
| 242 | empty | 484 | 996 | | | 192 | 240 | 248 | 248 | |
| empty | empty | 484 | 996 | | | 249 | 240 | 248 | 248 | |
| 484 | 484 | | 996 | | | 208 | 240 | 248 | 248 | MRU |
| 996 | | 484 | 242 | 242 | | 248 | 248 | 128 | 200 | |
| 996 | | 484 | empty | 242 | | 248 | 248 | 240 | 200 | |
| 996 | | 484 | 242 | empty | | 248 | 248 | 129 | 248 | |
| 996 | | 484 | empty | empty | | 248 | 248 | 240 | 248 | |
| 996 | | 484 | 484 | | | 248 | 248 | 240 | 208 | |
| 996 | | 242 | 242 | 484 | | 248 | 248 | 192 | 128 | |
| 996 | | empty | 242 | 484 | | 248 | 248 | 249 | 128 | |
| 996 | | 242 | empty | 484 | | 248 | 248 | 192 | 240 | |
| 996 | | empty | empty | 484 | | 248 | 248 | 249 | 240 | |
| 996 | | 484 | 484 | | | 248 | 248 | 208 | 240 | |

FIG. 22

| RU Allocation subfield (B7 B6 B5 B4 B3 B2 B1 B0) | #1 | #2 | Number of entries |
|---|---|---|---|
| 0-63 ($00y_2 y_1 y_0 z_2 z_1 z_0$) | 484 | 484 | 64 |
| 64-127 ($01y_2 y_1 y_0 z_2 z_1 z_0$) | 996 | 484 | 64 |
| 128-191 ($10y_2 y_1 y_0 z_2 z_1 z_0$) | MRU of 3×996 | 484 | 64 |
| 192-199 ($11000y_2 y_1 y_0$) | 484 | zero users | 8 |
| 200-207 ($11001y_2 y_1 y_0$) | zero users | 484 | 8 |
| 208-215 ($11010y_2 y_1 y_0$) | 996 | zero users | 8 |
| 216-223 ($11011y_2 y_1 y_0$) | MRU of 484+996 | | 8 |
| 224-231 ($11100y_2 y_1 y_0$) | MRU of 996+484 | | 8 |
| 232-239 ($11101y_2 y_1 y_0$) | 2×996 | | 8 |
| 240-247 ($11110y_2 y_1 y_0$) | MRU of 3×996 | zero users | 8 |
| 248 (11111000) | zero users | zero users | 1 |
| 249-255 | Reserved | | 7 |

FIG. 23

| RU size | 320 MHz | | | |
|---|---|---|---|---|
| | CC1, RA1 | CC2, RA3 | CC1(R), RA2 | CC2(R), RA4 |
| 484 | 484RU1, 484RU3 | 484RU2, 484RU4 | 484RU5, 484RU7 | 484RU6, 484RU8 |
| 996 | 996RU1+484RU3 | 484RU2+996RU2 | 996RU3+484RU7 | 484RU6+996RU4 |
| 2×996 | 2×996RU1 | 2×996RU2 | 2×996RU1 | 2×996RU2 |

FIG. 24B

| 320 MHz PPDU ||||||||| Values of RU Allocation subfields ||||
|---|---|---|---|---|---|---|---|---|---|---|---|
| 1 | 2 | 3 | 4 | 5 | 6 | 7 | 8 | CC1, RA1 | CC2, RA3 | CC1, RA2 | CC2, RA4 |
| 484 | 484 | 484 | 484 | | | | | 0 | 0 | | |
| empty | 484 | 484 | 484 | | | | | 200 | 0 | | |
| 484 | empty | 484 | 484 | | | | | 0 | 200 | | |
| 484 | 484 | empty | 484 | | | | | 192 | 0 | | |
| 484 | 484 | 484 | empty | | | | | 0 | 192 | | |
| 996 || 996 || | | | | 208 | 208 | | |
| 996 || 484 | 484 | | | | | 64 | 200 | | |
| 996 || empty | 484 | | | | | 208 | 200 | | |
| 996 || 484 | empty | | | | | 64 | 248 | | |
| 484 | 484 | 996 || | | | | 192 | 64 | | |
| empty | 484 | 996 || | | | | 248 | 64 | | |
| 484 | empty | 996 || | | | | 192 | 208 | | |
| 484 | 484 | 996 || | | | | 192 | 216 | | |
| empty | 484 | 996 || | | | | 248 | 216 | | |
| 484 | 484 | 996 || | | | | 216 | 192 | | |
| 484 | empty | 996 || | | | | 216 | 248 | | |
| 996 || 484 | 484 | | | | | 224 | 200 | | |
| 996 || 484 | empty | | | | | 224 | 248 | | |
| 996 || 484 | 484 | | | | | 200 | 224 | | |
| 996 || empty | 484 | | | | | 248 | 224 | | |
| 2×996 |||| | | | | 232 | 248 | | |

MRU

FIG. 24C

| | | | | | | | | | | |
|---|---|---|---|---|---|---|---|---|---|---|
| 996 | 484 | 484 | 2×996 | | | 128 | 200 | 248 | 248 | |
| 996 | empty | 484 | 2×996 | | | 240 | 200 | 248 | 248 | |
| 996 | 484 | empty | 2×996 | | | 129 | 248 | 248 | 248 | |
| 996 | empty | empty | 2×996 | | | 240 | 248 | 248 | 248 | |
| 996 | 996 | | 2×996 | | | 240 | 208 | 248 | 248 | |
| 484 | 484 | 996 | 2×996 | | | 192 | 128 | 248 | 248 | |
| empty | 484 | 996 | 2×996 | | | 249 | 128 | 248 | 248 | |
| 484 | empty | 996 | 2×996 | | | 192 | 240 | 248 | 248 | |
| empty | empty | 996 | 2×996 | | | 249 | 240 | 248 | 248 | |
| 996 | 996 | | 2×996 | | | 208 | 240 | 248 | 248 | MRU |
| 2×996 | | 996 | 484 | 484 | | 248 | 248 | 128 | 200 | |
| 2×996 | | 996 | empty | 484 | | 248 | 248 | 240 | 200 | |
| 2×996 | | 996 | 484 | empty | | 248 | 248 | 129 | 248 | |
| 2×996 | | 996 | empty | empty | | 248 | 248 | 240 | 248 | |
| 2×996 | | 996 | 996 | | | 248 | 248 | 240 | 208 | |
| 2×996 | | 484 | 484 | 996 | | 248 | 248 | 192 | 128 | |
| 2×996 | | empty | 484 | 996 | | 248 | 248 | 249 | 128 | |
| 2×996 | | 484 | empty | 996 | | 248 | 248 | 192 | 240 | |
| 2×996 | | empty | empty | 996 | | 248 | 248 | 249 | 240 | |
| 2×996 | | 996 | 996 | | | 248 | 248 | 208 | 240 | |

APPARATUS AND METHOD FOR REDUCING OVERHEAD OF SIGNALING FIELD IN PHYSICAL LAYER CONVERGENCE PROTOCOL IN WIRELESS LOCAL AREA NETWORK SYSTEM

CROSS-REFERENCE TO RELATED APPLICATIONS

This application claims the benefit of U.S. Provisional Application No. 63/029,641, filed on May 25, 2020 and 63/031,659, filed on May 29, 2020, in the U.S. Patent and Trademark Office and Korean Patent Application No. 10-2020-0166963, filed on Dec. 2, 2020, in the Korean Intellectual Property Office, the disclosures of which are incorporated herein by reference in their entireties.

TECHNICAL FIELD

This disclosure relates generally to wireless local area network (WLAN) communications, and more particularly to reducing overhead of a signaling field in a physical layer convergence protocol (PLCP) protocol data unit (PPDU) in a WLAN system.

DISCUSSION OF THE RELATED ART

A WLAN system connects two or more devices to each other, and typically to the Internet, in a local environment such as a building or campus. Most current WLAN technologies are based on the Institute of Electrical and Electronics Engineers (IEEE) 802.11 standard, commonly referred to as wireless fidelity (WiFi). The 802.11 standard has evolved into 802.11b, 802.11a, 802.11g, 802.11n, 802.11ac, and 802.11ax versions, where recent versions may support a transmission speed of up to about 9.6 Gbps by using orthogonal frequency-division multiplexing (OFDM) technology. In a typical scenario, an access point (AP) serves as a gateway to connect user devices such as smartphones and laptops to the Internet. Each user device may communicate with the AP and/or another user device using an assigned set of OFDM subcarriers within an overall frequency band of the WLAN.

In the 802.11ac version of the WLAN standard, data may be simultaneously transmitted to multiple users by using a multi-user multi-input multi-output (MU-MIMO) technique. However, a WLAN system to which version 802.11ac is applied permits uplink signals to be sent to an AP from one user device at a time, which may result in data communication becoming slow in areas where users are densely gathered.

The crowded user problem is addressed in version 802.11ax (also called high efficiency (HE)), which enables simultaneous uplink communication from multiple user devices to an AP using an orthogonal frequency-division multiple access (OFDMA) technique. With OFDMA, user devices are each assigned a Resource Unit (RU), which includes a set of segregated OFDM sub-carriers. The RU is used for both uplink and downlink, so that the WLAN system to which 802.11ax is applied (which also uses MU-MIMO) may effectively support communication in local areas and outdoors crowded with many users.

WLAN version 802.11be (also called extremely high throughput (EHT)), which is a next-generation WLAN standard, is expected to support a 6 GHz unlicensed frequency band, utilization of a bandwidth up to about 320 MHz per channel, adaptation of hybrid automatic repeat and request (HARD), and up to 16×16 MIMO. With this capability, it is expected that the next-generation WLAN system will effectively support low latency and ultra-high-speed transmission with performance metrics akin to new radio (NR) 5G technology.

SUMMARY

Embodiments of the inventive concept provide an apparatus and method for efficiently reducing overhead of a signaling field in a physical layer convergence protocol (PLCP) protocol data unit (PPDU) in a WLAN system.

According to an aspect of the inventive concept, a baseband circuit in a transmitting device of a WLAN includes: a storage; at least one processor (e.g., a controller and/or a signal processor) coupled to the storage and configured to generate a PPDU including a preamble and a payload, where the preamble includes a plurality of training fields and a plurality of signaling fields, and the payload includes a data field. A first signaling field among the plurality of signaling fields includes a compression mode field indicating whether resource unit (RU) allocation information designated for at least one receiving device is included in a second signaling field among the plurality of signaling fields. A binary value of the compression mode field represents whether the RU allocation information is included, and size information associated with an RU allocated to the at least one receiving device.

According to another aspect of the inventive concept, a baseband circuit arranged in a receiving device of a WLAN includes: a storage; at least one processor coupled to the storage and configured to decode a PPDU transmitted from a transmitting device to the receiving device. The PPDU includes a preamble and a payload, where the preamble includes a plurality of training fields and a plurality of signaling fields, and the payload includes a data field. A first signaling field among the plurality of signaling fields includes a compression mode field indicating whether RU allocation information designated for the receiving device is included in a second signaling field among the plurality of signaling fields. A binary value of the compression mode represents whether the RU allocation information is included and, size information associated with an RU allocated to the receiving device.

In another aspect, a method of wirelessly communicating in a wireless local area network (WLAN) includes generating, at a transmitting device, a PPDU comprising a preamble and a payload. A first signaling field in the preamble includes a compression mode field indicating whether resource unit (RU) allocation information designated for at least one receiving device is included in a second signaling field in the preamble. A binary value of the compression mode field represents whether the RU allocation information is included and, when the RU allocation information is included, size information associated with an RU allocated to the at least one receiving device. The PPDU is transmitted to the at least one receiving device.

The size information may represent that a size of the RU is less than a predetermined size, when the binary value is a first value, and may represent that the size of the RU equals or exceeds the predetermined size when the binary value is a second, different value.

BRIEF DESCRIPTION OF THE DRAWINGS

Embodiments of the inventive concept will be more clearly understood from the following detailed description taken in conjunction with the accompanying drawings in which:

FIG. 7 is a table of each subfield in FIG. 6;

FIG. 8 is a table of resource unit (RU) allocation indexing according to an RU Allocation subfield in FIG. 6;

FIG. 9 is a table illustrating some compression fields of an HE-SIG-A field in FIG. 4;

FIG. 14 is a table for describing a method of determining an EHT-SIG field structure, according to an embodiment;

FIGS. 15A, 15B and 15C are tables for describing an example of RU allocation indexing according to an RU Allocation subfield used in a non-compressed mode 1 in FIG. 14;

FIGS. 16A, 16B and 16C are tables for describing another example of the RU allocation indexing according to the RU Allocation subfield used in the non-compressed mode 1 in FIG. 14;

FIG. 17 is a table describing an example of the RU allocation indexing according to the RU Allocation subfield used in a non-compressed mode 2 in FIG. 14;

FIGS. 19A and 19B are diagrams for describing an RU Allocation subfield indexing of each content channel in the 80 MHz EHT MU PPDU based on FIGS. 17 and 18;

FIG. 20 is a table describing a relationship between content channels of the EHT-SIG field in a 160 MHz EHT MU PPDU and an RU size based on the RU Allocation subfield in FIG. 17;

FIGS. 21A, 21B and 21C are diagrams describing an RU Allocation subfield indexing of each content channel in the 160 MHz EHT MU PPDU based on FIGS. 17 and 20;

FIG. 22 is a table describing another example of the RU allocation indexing according to the RU Allocation subfield used in the non-compressed mode 2 in FIG. 14;

FIG. 23 is a table describing a relationship between content channels of the EHT-SIG field in a 320 MHz EHT MU PPDU and the RU size based on the RU Allocation subfield in FIG. 22; and FIGS. 24A, 24B and 24C are diagrams describing the RU Allocation subfield indexing of each content channel in the 320 MHz EHT MU PPDU based on FIGS. 22 and 23.

DETAILED DESCRIPTION OF EMBODIMENTS

Figure 1:
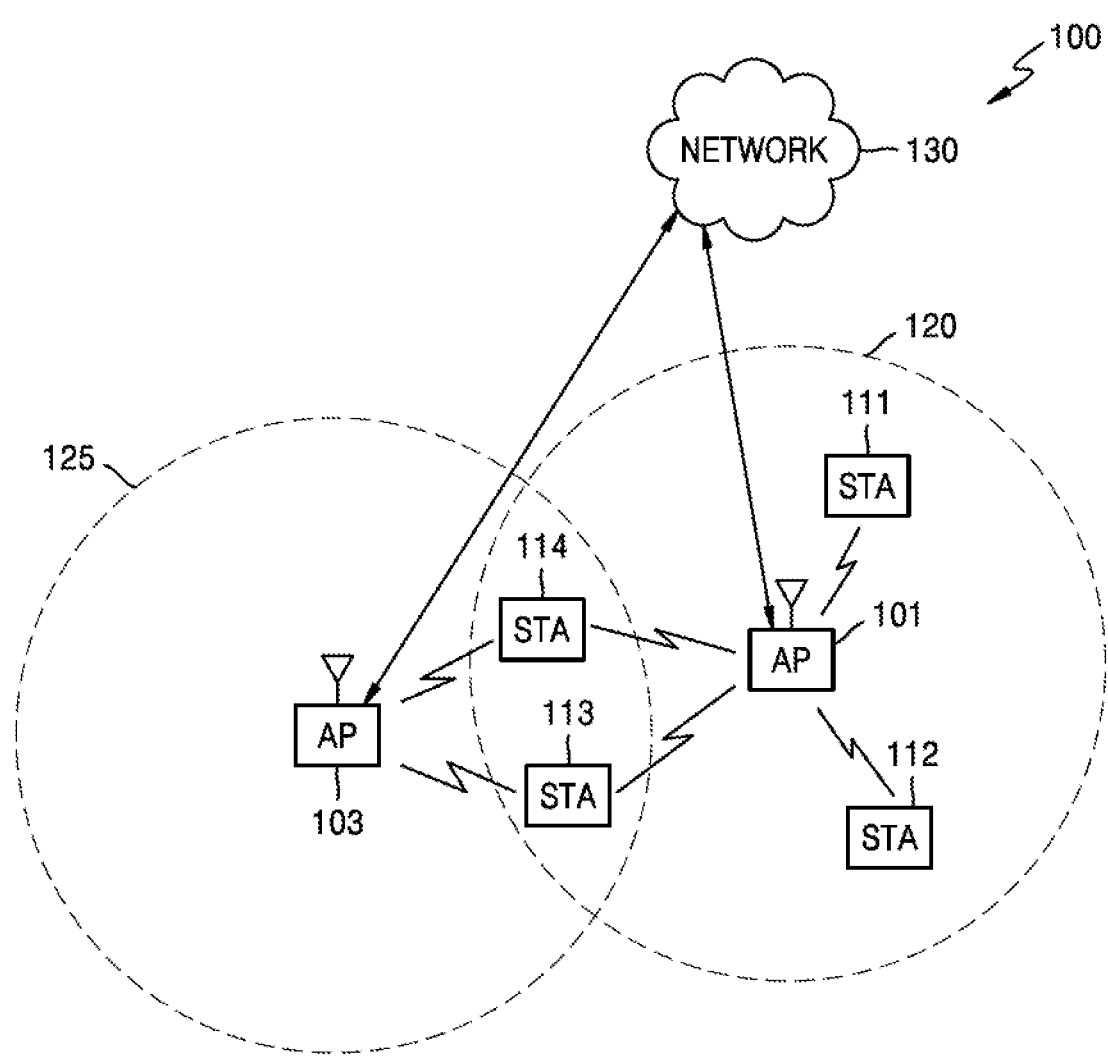
FIG. 1 is a diagram of a wireless local area network (WLAN) system.

Hereinafter, embodiments of the inventive concept will be described in detail with reference to the accompanying drawings, in which like reference characters refer to like elements or features.

The terms used in the present description are for describing example embodiments and are not intended to limit the scope of the inventive concept. In the present description, a singular form also encompasses a plural form unless particularly stated in the phrase. Components, steps, operations and/or elements that are referred to by terms "comprises" and/or "comprising" used in the inventive concept do not exclude presence or addition of one or more other components, steps, operations and/or elements.

Unless otherwise defined, all terms (including technical and scientific terms) used in the present description may be used as meanings that can be commonly understood by those of ordinary skill in the art to which the present disclosure belongs. In addition, the terms defined in a commonly used dictionary are not to be interpreted ideally or excessively unless defined explicitly and specifically.

In addition, in describing the embodiments of the inventive concept in detail, an OFDM or OFDMA-based wireless communication system, in particular, the IEEE 802.11 standard, is a main focus. However, a main subject of the inventive concept may be applicable with some modifications within the scope of the inventive concept to other communication systems having similar technical backgrounds and channel types (for example, long term evolution (LTE), LTE-advanced (A) (LTE-A), new radio (NR), wireless broadband (WiBro), and a cellular system such as global system for mobile communication (GSM), and a near field communication system such as Bluetooth and near field communication (NFC)), as understood by one of ordinary skill in the art.

Herein, the term "connect (couple)" and its derivatives refer to any direct or indirect communication between two or more components, whether they are in physical contact with each other. The terms "transmit", "receive", and "communicate" as well as their derivatives include both direct and indirect communications. The terms "comprise" and "equip" and their derivatives mean inclusion without limitation. The word "or" is an inclusive word meaning "and/or". "Related to ~" and its derivatives mean include, included in ~, interconnected with ~, contain, contained in ~, connect to ~, combine with ~, communicate with ~, cooperate with ~, intervene, put side by side, be close to ~, bounded by ~, have, have characteristics of have a relationship with ~, etc. The term "controller" means any device, system, or part thereof that controls at least one operation. Such a controller may be implemented in hardware or a combination of hardware and software and/or firmware. Functions related to any particular controller may be centralized or distributed locally or remotely.

Figure 2:
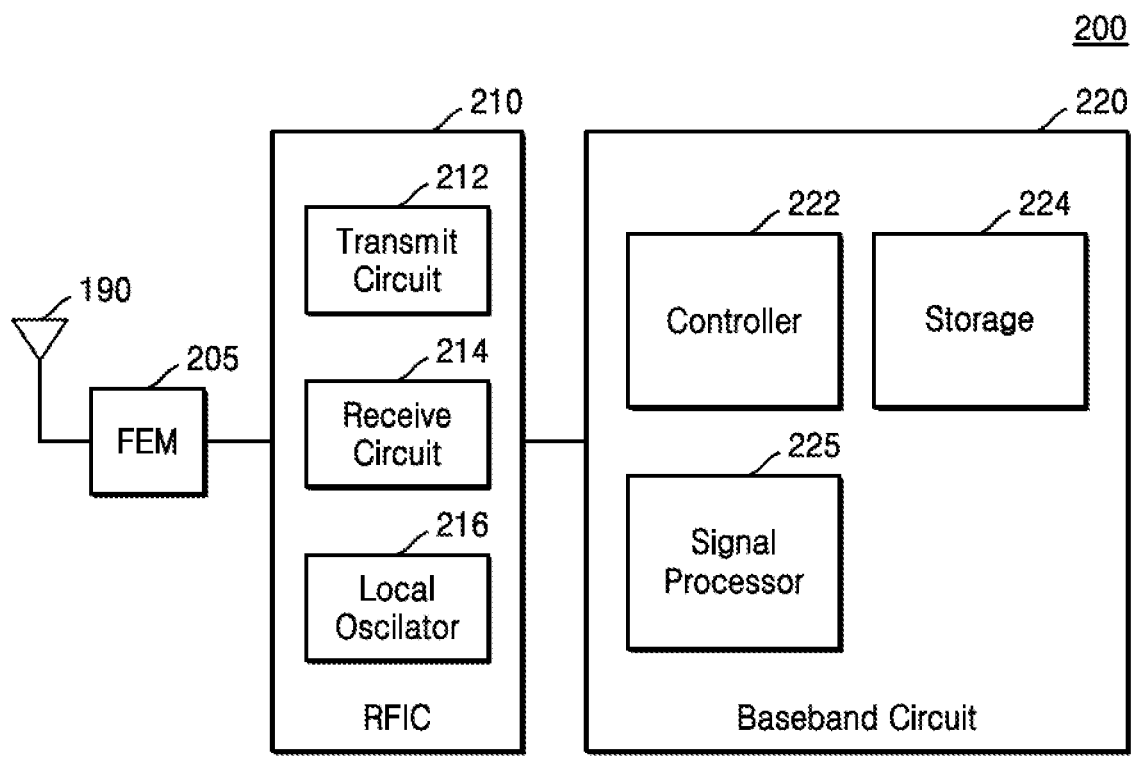
FIG. 2 is a block diagram of a wireless communication device transmitting or receiving a physical layer convergence protocol (PLCP) protocol data unit (PPDU)
Figure 3:
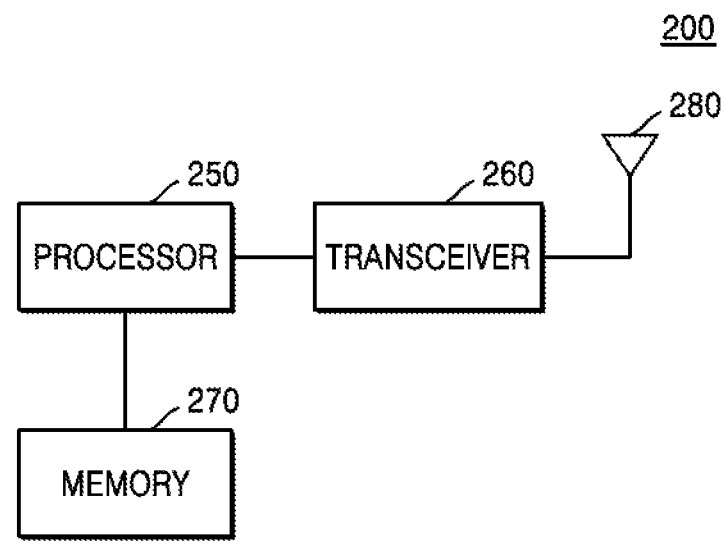
FIG. 3 is a schematic block diagram of an example of the wireless communication device of FIG. 2.

FIG. 1 is a diagram of a wireless local area network (WLAN) system. FIG. 2 is a block diagram of a wireless communication device transmitting or receiving a physical layer convergence protocol (PLCP) protocol data unit (PPDU). FIG. 3 is a block diagram of an example of the wireless communication device of FIG. 2.

As illustrated in FIG. 1, a WLAN system 100 may include access points (APs) 101 and 103. The APs 101 and 103 may communicate with at least one network 130 such as the Internet, an internet protocol (IP) network, a private data network, or the like. In addition, the APs 101 and 103 may provide wireless access to the network 130 for a plurality of stations (STAs) 111 through 114 in coverage areas 120 and 125 of the APs 101 and 103. In addition, the APs 101 and 103 may communicate with each other by using wireless fidelity (WiFi) or other WLAN communication technologies. In addition, the APs 101 and 103 may communicate with the plurality of STAs 111 through 114 by using WiFi or other WLAN communication technologies.

For example, depending on a network type, other well-known terms such as "router" and "gateway" may be used instead of "AP" or "access point". In addition, in the WLAN, an access point (AP) may be provided for a wireless channel. In addition, a first AP may operate as a STA when the first AP receives data from a second AP.

In addition, depending on the network type, "STA" or "station" may be used instead of other well-known terms such as "mobile station", "subscriber station", "remote terminal", "user equipment", "wireless terminal", "user device", and "user". For convenience, the term "STA" in the inventive concept may be used to refer to a remote wireless device that wirelessly accesses the AP or accesses a wireless channel in the WLAN. In the inventive concept, the STA may be referred to as a mobile device (for example, a mobile phone or a smartphone), but the STA may also include a stationary device (for example, a desktop computer, the AP, a media player, a stationary sensor, a television, etc.).

The dashed lines may illustrate an approximate extent of the coverage areas 120 and 125. In this case, the coverage areas 120 and 125 may be illustrated as an approximately having a circular shape for purposes of description and illustration. However, the coverage areas 120 and 125 related to the APs 101 and 103 may have different shapes reflecting various changes in the wireless environment related to natural or artificial obstructions, or may have other shapes including irregular shapes depending on configurations of the APs 101 and 103.

As described later in detail, the APs 101 and 103 may include circuitry and/or a program for managing an uplink (UL) MU or downlink (DL) MU transmission in the WLAN system. In addition, FIG. 1 illustrates only an example of the WLAN system 100, but various changes may be made. For example, the WLAN system 100 may include an arbitrary number of access points AP and an arbitrary number of stations STA, which are arbitrarily and suitably positioned. In addition, the AP 101 may directly communicate with any number of STAs. Further, the AP 101 may provide the STAs 111 to 114 with wireless broadband access to the network 130.

Similarly, the APs 101 and 103 may communicate directly with the network 130, and may provide the network 130 with wireless broadband access to the STAs 111 through 114. In addition, the APs 101 and 103 may implement connections to various external networks such as an external telephone network or a data network.

Next, in FIG. 2, a wireless communication device transmitting or receiving the PPDU is illustrated. For example, a wireless communication device 200 of FIG. 2 may be included in a transmitting device (e.g., an AP) or a receiving device (e.g., a STA). In other words, the wireless communication device 200 of FIG. 2 may be included in any one of the APs 101 and 103 and the STAs 111 through 114 illustrated in FIG. 1, and may be applied to a sensor used in, for example, a computer, a smartphone, a portable electronic device, a tablet, a wearable device, an internet of things (IoT) device, or the like. In the following description, a STA may be an example of a "receiving device", and the terms "user" and "STA" may be used interchangeably. Further, an AP may be used as an example of a "transmitting device".

The wireless communication device 200 may include an antenna 190, a front-end module (FEM) 205, a radio frequency integrated circuit (RFIC) 210, and a baseband circuit 220. In addition, although not illustrated in the drawing, the wireless communication device 200 may further include a power modulator supplying a power voltage (for example, a dynamically variable output voltage) to a power amplifier in the RFIC 210. The power modulator may be driven in an average power tracking mode or an envelope tracking mode to generate and output the power voltage.

For example, the FEM 205 and the RFIC 210 may be implemented in one chip as a single component. In this case, a function of the FEM 205 and a function of the RFIC 210, which are described later, may be implemented together in one chip. However, for convenience of description, in the embodiment, an example in which the FEM 205 and the RFIC 210 are separate components will be described.

The antenna 190 may be connected to the FEM 205, may transmit a signal received from the FEM 205 to another wireless communication device (a terminal or a station), or may provide the FEM 205 with a signal received from another wireless communication device. In addition, the FEM 205 may be connected to the antenna 190, and separate a transmitting frequency from a receiving frequency. In other words, the FEM 105 may separate the signals provided by the RFIC 210 for each frequency band, and provide the separated signals to the corresponding antenna 190. The FEM 205 may also provide the RFIC 210 with a signal received from the antenna 190.

In this manner, the antenna 190 may transmit the signal that is frequency-separated by the FEM 205 to free space, or provide a signal wirelessly received from an external source to the FEM 205.

The antenna 190 may be a single antenna, an array antenna, or a plurality of antennas (not necessarily operating as an array. Accordingly, in some embodiments, the wireless communication device 200 may support a phased array, multiple-input and multiple-output (MIMO), or the like when the antenna 190 is a plurality of antennas. However, in FIG. 2, for convenience of description, one antenna is illustrated.

In addition, the FEM 205 may include an antenna tuner (not illustrated). In addition, the antenna tuner (not illustrated) may be connected to the antenna 190, and adjust the impedance of the antenna 190 connected thereto.

The RFIC 210 may generate an RF signal by performing a frequency up-conversion on a baseband signal provided by the baseband circuit 220. In addition, the RFIC 210 may generate the baseband signal by performing a frequency down-conversion operation on the RF signal provided by the FEM 205.

The RFIC 210 may include a transmit circuit 212 for a frequency up-conversion operation, a receive circuit 214 for a frequency down-conversion operation, and a local oscillator 216.

For example, although not illustrated in the drawing, the transmit circuit 212 may include a first analog baseband filter, a first mixer, and a power amplifier. In addition, the receive circuit 214 may include a second analog baseband filter, a second mixer, and a low-noise amplifier.

In this case, the first analog baseband filter may filter the baseband signal received from the baseband circuit 220, and provide the filtered baseband signal to the first mixer. In addition, the first mixer may perform the frequency up-conversion operation of converting a frequency of the baseband signal from the baseband to a high frequency band by using a frequency signal provided by the local oscillator 216.

By using the frequency up-conversion operation, the baseband signal may be provided as an RF signal to the power amplifier, and the power amplifier may power-amplify the RF signal and provide the power-amplified RF signal to the FEM 205.

In addition, the low-noise amplifier may amplify the RF signal provided by the FEM 205, and provide the amplified RF signal to the second mixer. In addition, the second mixer may perform the frequency down-conversion operation of converting the frequency of the RF signal from the high frequency band to the baseband by using the frequency signal provided by the local oscillator 216. By using the frequency-down conversion operation, the RF signal may be provided as a baseband signal to a second analog baseband filter, and the second analog baseband filter may filter the baseband signal and provide the filtered baseband signal to the baseband circuit 220.

On the other hand, the baseband circuit 220 may receive and process a baseband signal provided by the RFIC 210, or may generate and provide the baseband signal to the RFIC 210.

In addition, the baseband circuit 220 may include a controller 222, a storage 224, and a signal processor 225.

The controller 222 may control all operations of not only the baseband circuit 220 but also the RFIC 210. In addition, the controller 222 may write and/or read data to and/or from the storage 224. To this end, the controller 222 may include at least one processor, one microprocessor, or one microcontroller, or may include a portion of the processor. The controller 222 may include, for example, a central processing unit (CPU), a digital signal processor (DSP), or the like.

The storage 224 may store data such as a basic program, an application program, setting information, or the like for the operation of the wireless communication device 200. For example, the storage 224 may store instructions and/or data related to the controller 222, the signal processor 225, or the RFIC 210. In addition, the storage 224 may store RU allocation information, compression mode select information, a PPDU format, or the like.

In addition, the storage 224 may include various storage media, some examples of which are a volatile memory, a non-volatile memory, or a combination thereof; dynamic (D) RAM (DRAM), phase-change (P) RAM (PRAM), magnetic (M) RAM (MRAM), static (S) RAM (SRAM), or the like), a flash memory (a NAND flash memory, a NOR flash memory, a ONE NAND flash memory, or the like), or the like.

In addition, the storage 224 may store various processor-executable instructions. Such processor-executable instructions may be executed by the controller 222.

The signal processor 225 may process the baseband signal provided by the RFIC 210, and may process the baseband signal to be provided to the RFIC 210.

For example, for convenience of description, the signal processor 225 will be described with a focus on components in a receiving path.

The signal processor 225 may include a demodulator, a receiving filter and cell searcher (RxFilter & cell searcher), a cell searcher, or others.

First, the demodulator may include a channel estimator, a data deallocation unit, an interference whitener, a symbol detector, a channel state information (CSI) generator, and a mobility measurement unit, an automatic gain control unit, an automatic frequency control unit, a symbol timing recovery unit, a delay spread estimation unit, a time correlator, or the like, and may perform a function of each component.

In this case, the mobility measurement unit may include a unit that measures signal quality of a serving cell and/or a neighbor cell to support mobility, and may measure a received signal (RS) strength indicator (SI) (RSSI), RS received power (RP) (RSRP), an RS received quality (RQ) (RSRQ), and an RS-signal-to-interference & noise ratio (INR) (RS-INR), etc.

In addition, the receiving filter and cell searcher (RxFilter & cell searcher) may include the receiving filter (RxFilter), the cell searcher, a fast Fourier Transform (FFT) unit, a time duplex (TD)-automatic gain control (AGC) (TD-AGC) unit, and a TD-automatic frequency control (AFC) (TD-AFC) unit, or the like.

In this case, the RxFilter (also referred to as an Rx Front End) may perform operations such as sampling, interference cancellation, and amplification on the baseband signal received from the RFIC 210. In addition, because the cell searcher includes a primary synchronization signal (PSS) detector, a secondary synchronization signal (SSS) detector, or the like, the size and quality of adjacent cell signals may be measured.

Other elements may include a symbol processor, a channel decoder, other components in transmission paths, or the like. The symbol processor may perform channel-deinterleaving, de-multiplexing, rate-matching, or the like, so that a signal that has undergone demodulation may be decoded for each channel. In addition, the channel decoder may decode a signal that has undergone demodulation in units of code blocks. In addition, the symbol processor and the channel decoder may include a hybrid automatic repeat request (HARQ) processing unit, a turbo decoder, a cyclical redundancy check (CRC) checker, a Viterbi decoder, a turbo encoder, or the like.

In addition, the other components in transmission paths may include transmit (TX) first-in-first-out (TX FIFO), an encoder, a scrambler, an interleaver, a constellation mapper, an inversed discrete Fourier transformer (IDFT), a guard interval and windowing insertion module, or the like.

As described above, in FIG. 2, the baseband circuit 220 is illustrated as including the controller 222, the storage 224, and the signal processor 225.

However, in the baseband circuit 220, two or more of the controller 222, the storage 224, and the signal processor 225 may be integrated into one body. In addition, in other examples, the baseband circuit 220 and/or the signal processor 225 may further include components other than those described above, or may omit one or more of the described components.

In addition, in some embodiments, the controller 222, the storage 224, and the signal processor 225 may be included in one device. In other embodiments, each of the controller 222, the storage 224, and the signal processor 225 may be distributed and included in different devices (for example, a distributed architecture).

In addition, the RFIC 210 and the baseband circuit 220 may also include components well known to those of ordinary skill in the art, as illustrated in the drawing. In addition, the corresponding components may be executed in a manner well known to those of ordinary skill in the art, and may be executed by using hardware, firmware, software logic, or a combination thereof.

However, FIG. 2 illustrates only an example of a wireless communication device; various changes (addition or deletion of components) may be made to FIG. 2.

In this case, referring to FIG. 3, an example in which the configuration of the wireless communication device 200 of FIG. 2 is partially changed (simplified) is illustrated.

The wireless communication device 200 of FIG. 2 may include a processor 250, a transceiver 260, a memory 270, and an antenna 280, as illustrated in FIG. 3.

The processor 250 may control all operations of the transceiver 260, and may write or read data to or from the memory 270. In other words, the processor 250 may include a component having, for example, the function of the controller 222 in FIG. 2.

The transceiver 260 may transmit and receive radio signals, and may be controlled by the processor 250. The transceiver 260 may include a component having the functions of the FEM 205, the RFIC 210, and the signal processor 225 in FIG. 2.

Accordingly, when the wireless communication device 200 is included in a transmitting device, the transceiver 260 may generate the PPDU including a preamble and a payload, and transmit the generated PPDU to a receiving device.

On the other hand, when the wireless communication device 200 is included in a receiving device, the transceiver 260 may receive the PPDU including a preamble and a payload from a transmitting device. In addition, the transceiver 260 may decode the payload based on the preamble of the received PPDU. In other words, the transceiver 260 may decode the preamble of the PPDU by using an internal decoder (for example, the decoder of the signal processor 225 in FIG. 2), and may decode the payload of the PPDU based on the decoding result.

The memory 270 may store data such as a basic program, an application program, setting information, or the like for the operation of the wireless communication device 200. Accordingly, the memory 270 may store instructions and/or data related to the processor 250 and the transceiver 260. In other words, the memory 270 may include a component having, for example, the function of the storage 224 in FIG. 2.

The antenna 280 may be connected to the transceiver 260, transmit a signal received from the transceiver 260 to another wireless communication device (a terminal or a base station), or provide a signal received from another wireless communication device to the transceiver 260. In other words, the antenna 280 may include a component having, for example, the function of the antenna 190 in FIG. 2.

In this manner, in the embodiment, the wireless communication device 200 may have the above-described characteristics and configurations. Hereinafter, with reference to FIGS. 4 through 9, the HE MU PPDU used in IEEE 802.11ax will be described.

For example, the HE MU PPDU to be described with reference to FIGS. 4 through 9 may be generated in the wireless communication device 200 of FIGS. 2 and 3 (in the case where the wireless communication device is an AP), and may be decoded by the wireless communication device 200 illustrated in FIGS. 2 and 3 (in the case where the wireless communication device is a STA). In addition, the HE MU PPDU to be described with reference to FIGS. 4 through 9 may have a structure according to the IEEE 802.11ax standard.

Figure 4:
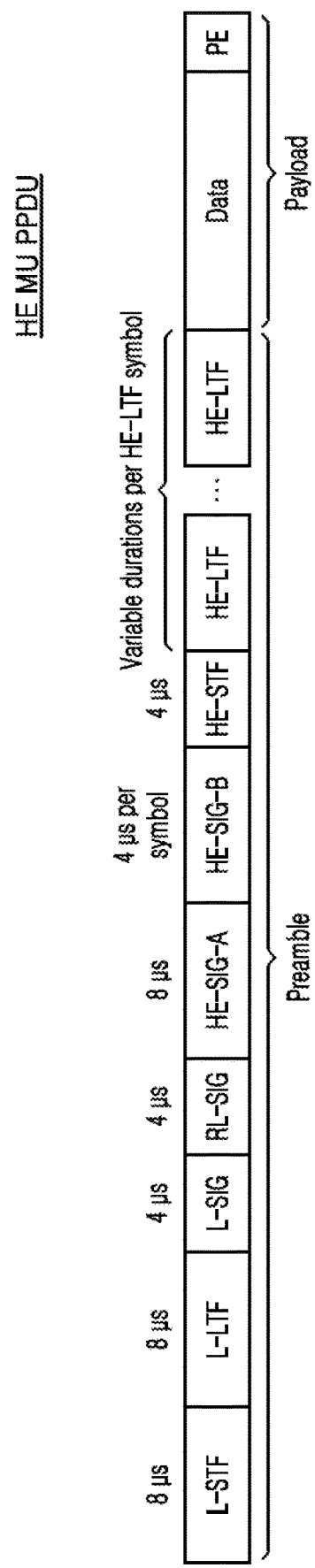
FIG. 4 is a diagram of a structure of a high efficiency (HE) multi-user (MU) PPDU according to IEEE 802.11ax.

FIG. 4 is a diagram of a structure of the HE MU PPDU according to the IEEE 802.11ax standard.

The HE MU PPDU may include a preamble including a plurality of training fields and a plurality of signaling fields, and a payload including a data field and a packet extension unit.

The HE MU PPDU may include a legacy (L)-short training field (STF) (L-STF) (8 μs length), a legacy-long training field (LTF) (L-LTF) (8 μs length), an L-SIG (4 μs length), a repeated L-SIG (RL-SIG) (4 μs length), an HE-SIG-A (8 μs length), an HE-SIG-B (4 μs length per symbol), an HE-STF (4 μs length), an HE-LTF (variable duration per HE-LTF symbol), data DATA (that is, a data field), and a packet extension (PE) (that is, a packet extension field).

Each field included in the preamble are briefly described as follows.

The L-STF may include a short OFDM symbol, and may be used for frame detection, automatic gain control (AGC), diversity detection, and coarse frequency/time synchronization.

The L-LTF may include a long training OFDM symbol, and may be used for fine frequency/time synchronization and channel prediction.

The L-SIG may be used for transmission of control information, and may include information about a data rate and a data length. For example, the L-SIG may be repeatedly transmitted, and a format in which the L-SIG is repeated may be referred to as the RL-SIG.

The HE-SIG-A may include control information common to the receiving devices, which is as follows.

1) A DL/UL indicator.

2) A basic service set (BSS) color field which is an identifier of the BSS.

3) A field indicating remaining time of a current transmission opportunity (TXOP) section.

4) A bandwidth field indicating a range as one of 20/40/80/160/80+80 MHz.

5) A field indicating a modulation and coding scheme (MCS) applied to the HE-SIG-B.

6) A field indicating whether the HE-SIG-B is modulated by using a dual sub-carrier modulation technology.

7) A field indicating the number of symbols used for the HE-SIN-B.

8) A field indicating whether the HE-SIG-B is generated across all bandwidths.

9) A field indicating the number of symbols of the HE-LTF.

10) A field indicating a length of the HE-LTF and a length of a cyclic prefix (CP).

11) A field indicating whether there is an additional OFDM symbol for coding of a low density parity check (LDPC).

12) A field indicating information about the PE.

13) A field indicating information about cyclical redundancy check (CRC) of the HE-SIG-A.

The HE-SIG-A may further include various information in addition to the information of 1) through 13) described above, or may not include some of them. In addition, in an environment other than an MU environment, some information may be further added to the HE-SIG-A, or some information of the HE-SIG-A may be omitted.

The HE-SIG-B may be used in the PPDU for the MU. In other words, the HE-SIG-B may be omitted from the PPDU for a single user (SU). The HE-SIG-A or HE-SIG-B may include the RU allocation information for at least one receiving device. More detailed information about HE-SIG-B will be described with reference to FIGS. 5 through 8.

Figure 5:
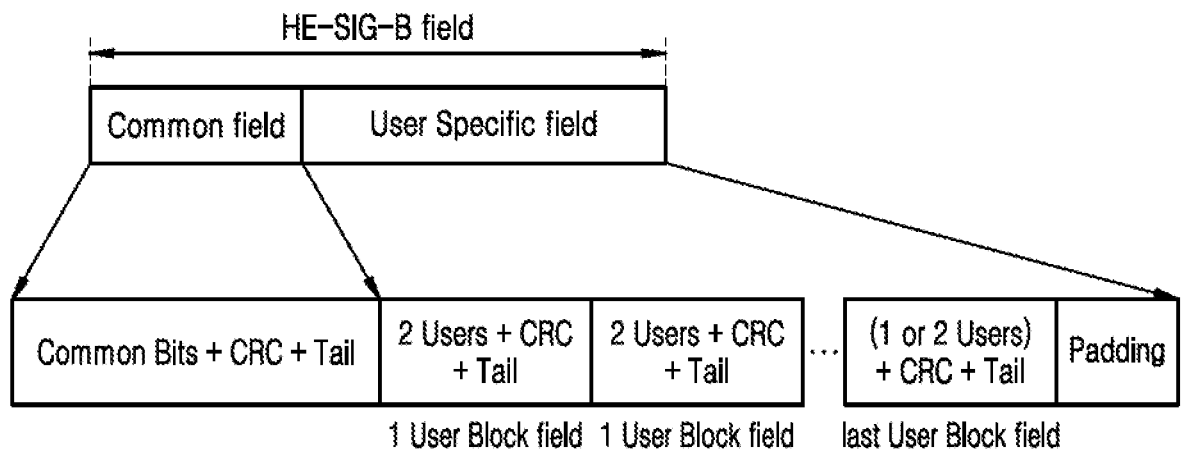
FIG. 5 is a diagram of a structure of an HE-signaling (SIG)-B (HE-SIG-B) field in FIG. 4.

FIG. 5 is a diagram of a structure of the HE-SIG-B field in FIG. 4. The HE-SIG-B field may include a common field including common control information and a user specific field including user specific control information. In this case, the common field may be encoded separately from the user specific field. In addition, the common field may include information about RU allocation and a 'CRC subfield' corresponding thereto, and may be coded as one binary convolutional coding (BCC) block. In addition, the user specific field may be coded as one BCC block by including information for decoding the payload of two users (for example, 2 STAs), a corresponding 'CRC subfield', or the like.

Figure 6:
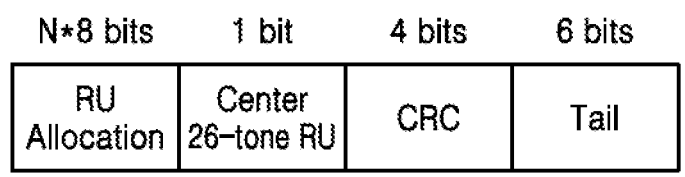
FIG. 6 is a diagram of a structure of a common field in FIG. 5.

FIG. 6 is a diagram of a structure of a common field in FIG. 5. FIG. 7 is a table of each subfield in FIG. 6. Referring to FIGS. 6 and 7, the common field of the HE-SIG-B may include various subfields such as the RU Allocation subfield, a Center 26-tone RU subfield, the CRC subfield, and a tail subfield.

The RU Allocation subfield may include N×8 (N is one of 1, 2, and 4) bits. In this case, N is the number of RU Allocation subfields in an HE-SIG-B content channel.

For example, the number of RU Allocation subfields in the HE-SIG-B content channel in 20 MHz and 40 MHz HE MU PPDUs (that is, N) may be 1, and that in 80 MHz HE MU PPDUs (that is, N) may be 2. In addition, the number of RU Allocation subfields (that is, N) in the HE-SIG-B content channel in 160 MHz or 80+80 MHz HE MU PPDU may be 4.

For example, in 802.11ax, a basic unit (or granularity) of the RU Allocation subfield corresponding to the frequency domain of the data field may be 20 MHz. Here, the meaning of 'the granularity of the RU Allocation subfield may be 20 MHz' may be that 'the RU Allocation subfield may direct the RU allocation information in units of 20 MHz'. However, in the embodiment to be applied to 802.11be and later standards, the basic unit of the RU Allocation subfield may be any one of 20 MHz, 40 MHz, and 80 MHz, or another bandwidth, and thus, details thereof will be described later.

FIG. 8 is a table of the RU allocation indexing according to an RU Allocation subfield in FIG. 6. In FIG. 8, an example of the RU allocation indexing according to the RU Allocation subfield is illustrated. As illustrated in FIG. 8, the RU Allocation subfield may direct the RU allocation in the frequency domain, and may direct the number of user fields (e.g., the number of STAs) that are allocable to each RU. In addition, in 802.11ax, because the MU-MIMO is supported for the RU having a magnitude of 106 subcarriers ("106-tone") or more, the number of multiplexed users may be directed by the RU Allocation subfield for the RU having a magnitude of 106-subcarrier (that is, 106-tone) or more. However, in the embodiment applied to 802.11be and later standards, because the RI allocation indexing due to the RU Allocation subfield may vary due to a fact that the MU-MIMO is supported for the RU having a magnitude of 242 subcarriers (that is, 242-tone) or more, and due to a change in the granularity of the RU Allocation subfield and a multi-RU allocation support. Detailed descriptions thereof will be given later.

Referring again to FIGS. 6 and 7, the center 26-tone RU subfield may include 1 bit, and may indicate whether the total bandwidth is 80 MHz, 160 MHz, or 80+80 MHz. In addition, the CRC subfield may include 4 bits, and may be used to detect when there is an error in the common field data. In addition, the tail subfield may include 6 bits, may be used to terminate a trellis of a convolution decoder, and may be set to 0.

In this manner, because the common field of the HE-SIG-B field may be configured, further detailed description of the HE-SIG-B will be omitted.

FIG. 9 is a table describing some RU Allocation subfields of an HE-SIG-A field in FIG. 4. In FIG. 9, some fields in the HE-SIG-A field described above with reference to FIG. 4 are illustrated. Among the fields illustrated in FIG. 9, the 'HE-SIG-B compression field' may be a field for indicating whether there is a common field in the HE-SIG-B field.

When a value of the 'HE-SIG-B compression field' is set to 0, there may be a common field in the HE-SIG-B field. In this case, the OFDMA method in which each user (that is, each STA) is provided with data from an AP via different RUs from each other may be supported. In addition, in this case, to provide information about the RU allocation to each user, there may be an RU Allocation subfield in the common field in the HE-SIG-B field.

On the other hand, when the value of the 'HE-SIG-B compression field' is set to 1, there may not be a common field in the HE-SIG-B field. In this case, because each user (that is, each STA) is provided with data by the AP via the entire bandwidth of the HE MU PPDU (that is, the entire frequency domain bandwidth of the data field), the OFDMA method may not be supported. In addition, in this case, because it is not necessary to provide information about the RU allocation to each user, it may not be necessary that the RU Allocation subfield is in the HE-SIG-B field.

However, in the embodiment to be applied to 802.11be and later standards, when there is a common field in the EHT-SIG field (that is, a field corresponding to the HE-SIG-B field of 802.11ax), because the basic unit of the RU Allocation subfield and a support availability of the MU-MIMO vary according to the magnitude of the RU allocated to the STA, detailed descriptions thereto will be given later.

Because it is possible that the HE MU PPDU of version 802.11ax is configured in this manner, hereinafter, the EHT MU PPDU of version 802.11be will be described with reference to FIG. 10. For example, the EHT MU PPDU to be described with reference to FIG. 10 may be generated in the wireless communication device 200 of FIGS. 2 and 3 (when the wireless communication device is an AP), and may be decoded by the wireless communication device 200 of FIGS. 2 and 3 (when the wireless communication device is a STA).

Figure 10:
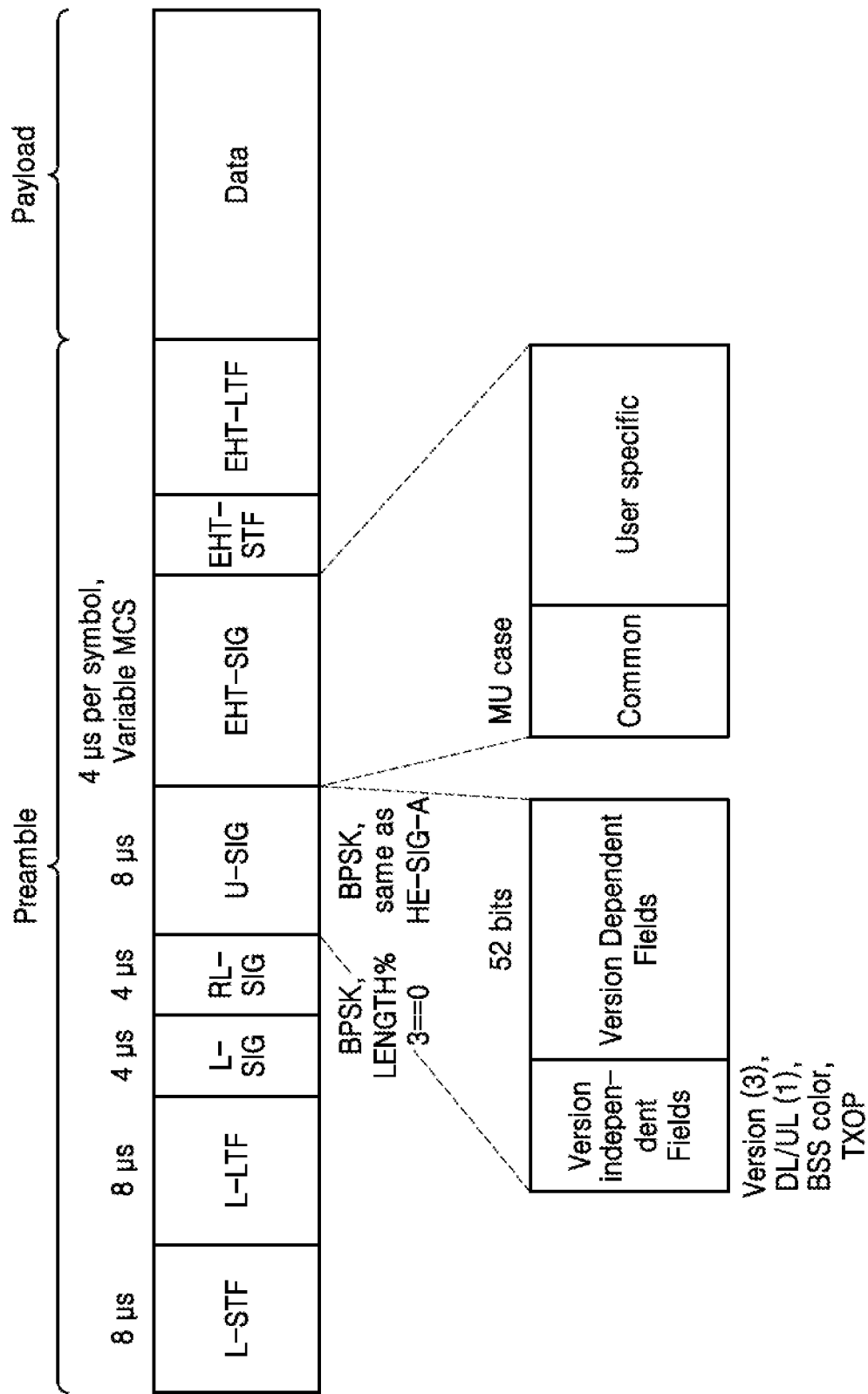
FIG. 10 is a diagram of a structure of an extremely high throughput (EHT) MU PPDU according to IEEE 802.11be.

FIG. 10 is a diagram of a structure of the EHT MU PPDU according to IEEE 802.11be.

Referring to FIG. 10, the EHT MU PPDU may include a preamble including a plurality of training fields and a plurality of signaling fields, and the payload including a data field.

The EHT MU PPDU may include the L-STF (8 μs length), the L-LTF (8 μs length), the L-SIG (4 μs length), the RL-SIG (4 μs length), a universal (U) SIG (U-SIG) (8 μs length), the EHT-SIG (4 μs length per symbol, variable MCS), the EHT-STF, the EHT-LTF, and data DATA (that is, the data field).

For example, although not illustrated in the drawing, the payload of the EHT MU PPDU may further include the PE. However, in the embodiment, for convenience of description, each EHT MU PPDU will be described as an example that does not include the PE.

On the other hand, each field included in the EHT MU PPDU is briefly described as follows.

For example, 'L-STF', 'L-LTF', 'L-SIG', and 'RL-SIG' of the EHT MU PPDU may be identical or similar to 'L-STF', 'L-LTF', 'L-SIG', and 'RL-SIG' described above, and thus, detailed descriptions thereof will be omitted.

The U-SIG may be a field responsible for a function similar to that of the HE-SIG-A of the HE MU PPDU, may be arranged immediately after the RL-SIG field, and may include two commonly encoded OFDM symbols.

The U-SIG may include 'version-independent fields' and 'version-dependent fields', and the 'version-dependent fields' may be arranged after the 'version-independent fields'.

Here, the 'version-independent fields' may have static locations and bit definitions across different generations/physical (PHY) versions from each other.

In addition, the 'version-independent fields' may include, for example, the following control information.

1) A PHY version identifier (configured with 3 bits).
2) UL/DL flag (configured with 1 bit).
3) A basic service set (BSS) color (that is, an identifier of the BSS).
4) A TXOP duration (that is, a field indicating the remaining time of the current TXOP duration)
5) A bandwidth (that is, a bandwidth field; for example, capable of carrying some puncturing information).

On the other hand, the 'version-dependent fields' may have a variable bit definition for each PHY version.

In addition, the 'version-dependent fields' may include, for example, the following control information.

1) A PPDU type (a field indicating the PPDU type).
2) A field indicating the MCS scheme applied to the EHT-SIG MCS, which is in the U-SIG of the EHT PPDU transmitted to the MU).
3) A field indicating the number of EHT-SIG symbols used for the EHT-SIG, which is in the U-SIG of the EHT PPDU transmitted to the MU.
4) A field indicating whether the common field is included in the EHT-SIG, which hereinafter, will be referred to as a compression mode field.

The U-SIG may further include various information in addition to the information described above, or may not include some of the information described above. In addition, in an environment other than the MU environment, some information may be further added to the U-SIG, or some information of the U-SIG may be omitted.

The EHT-SIG may be a field that performs a similar function to that of the HE-SIG-B of the HE MU PPDU, may be arranged immediately after the U-SIG field in the EHT MU PPDU, and may have a variable MCS scheme and a variable length.

The EHT-SIG may include the common field including the common control information and the user specific field including the user specific control information.

In this case, the common field may be encoded separately from the user specific field. In addition, the common field may include RU allocation-related information (for example, the RU allocation information) to be described later, and the user specific field may include similar information to information included in the user specific field of the HE-SIG-B (for example, user information allocated to each RU).

In this manner, the EHT MU PPDU of the IEEE standard (that is, 802.11be) may be configured, and an embodiment may be implemented in a signaling field (for example, the U-SIG or EHT-SIG) of the EHT MU PPDU described above. Of course, the embodiment may be implemented in an EHT MU PPDU or another EHT PPDU (for example, EHT TB PPDU) of a different type in addition to the aforementioned EHT MU PPDU, and may be implemented in the PPDU according to standards after 802.11be (that is, an EHT+ standard). However, in the following, for convenience of description, the embodiment will be described as an example that is implemented in the EHT MU PPDU described above.

For example, when the STA transmits data to another STA, the embodiment may be applicable even when the STA transmits to the AP. In addition, the embodiment may be applied not only to a DL OFDMA scheme and an UL OFDMA scheme, but also to an environment supporting the SU such as the SU PPDU.

As described above, the method for reducing overhead of the signaling field in the PPDU according to the present embodiment may be applied to the EHT MU PPDU. Hereinafter, with reference to FIGS. 11 through 23B, the method of reducing overhead of the signaling field in the PPDU will be described.

Figure 11:
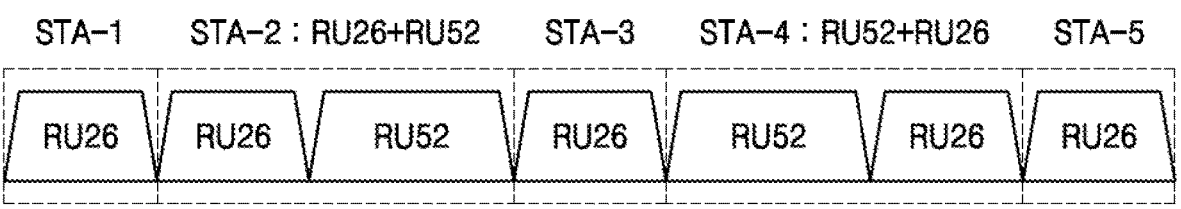
FIG. 11 is a diagram of an example in which multiple RUs are allocated to stations STA in a 20 MHz orthogonal frequency-division multiplexing access (OFDMA) PPDU configured with small-size RUs.
Figure 12:
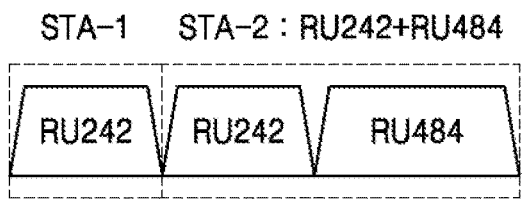
FIG. 12 is a diagram of an example in which multiple RUs are allocated to STAs in an 80 MHz OFDMA PPDU configured with large-size RUs.
Figure 13:
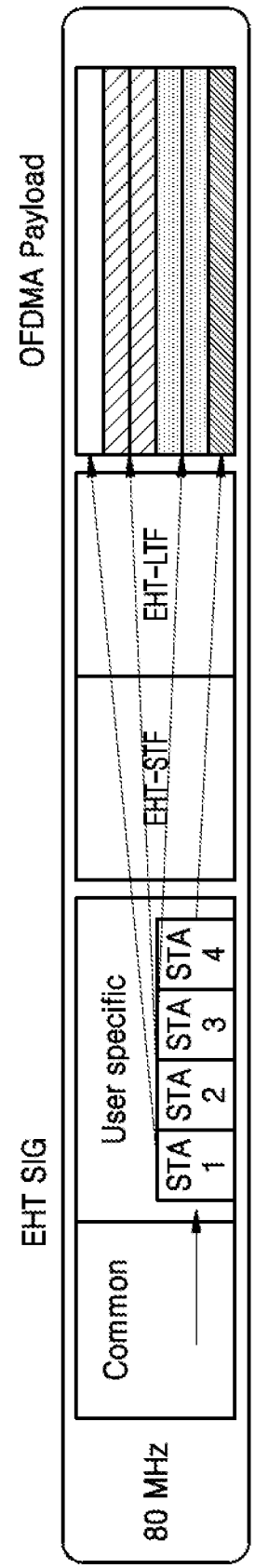
FIG. 13 is a diagram of an example in which OFDMA transmission is signaled via the EHT-SIG field in FIG. 10.
Figure 18:
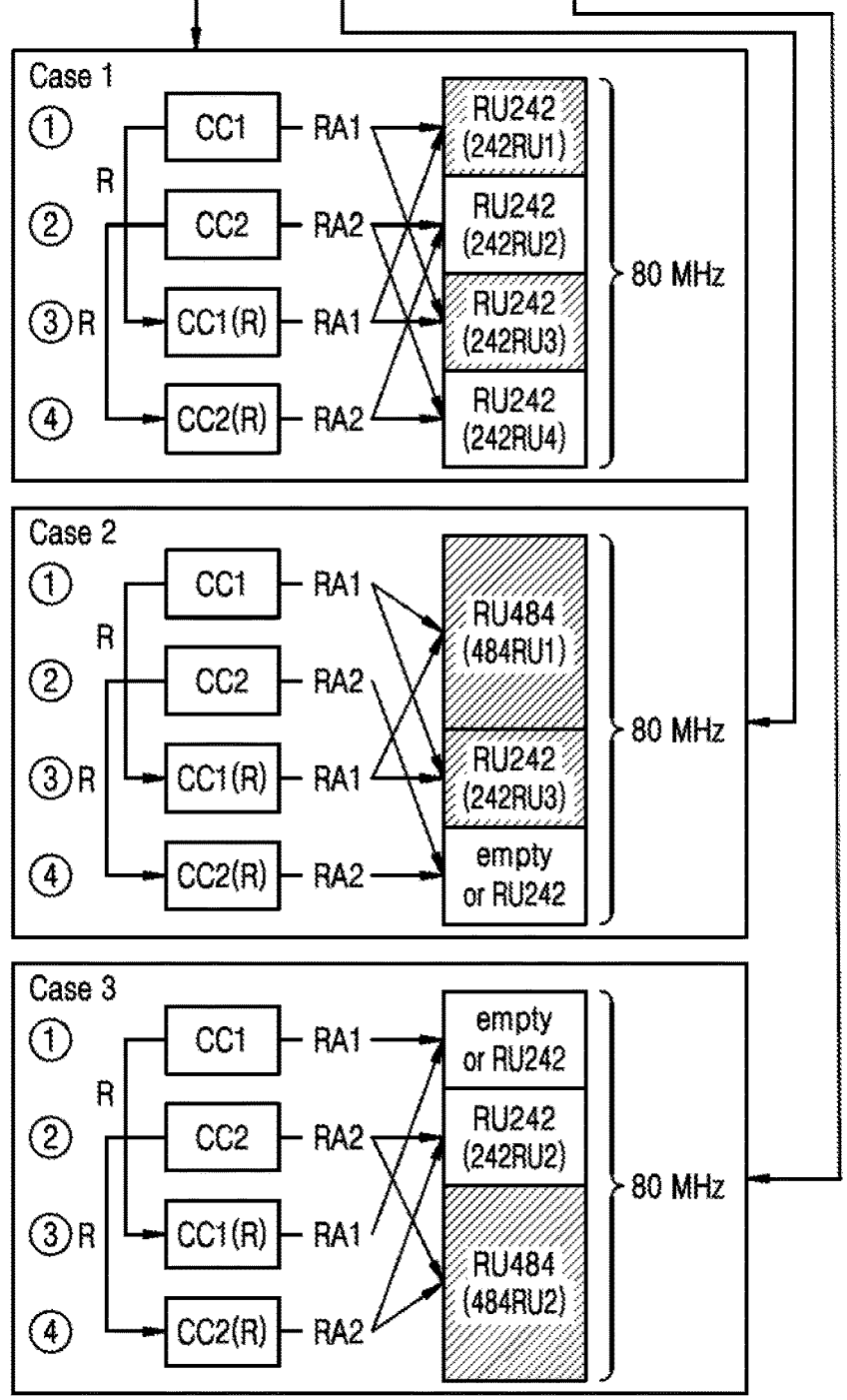
FIG. 18 is a table describing a relationship between content channels of an EHT-SIG field in an 80 MHz EHT MU PPDU and the RU size based on the RU Allocation subfield in FIG. 17.
Figure 19A:
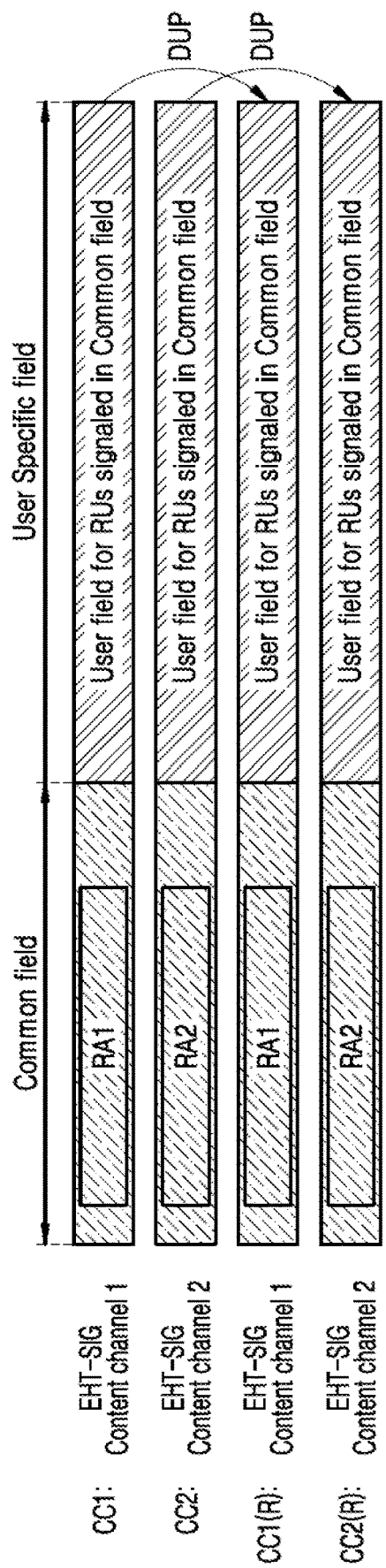
Figure 21A:
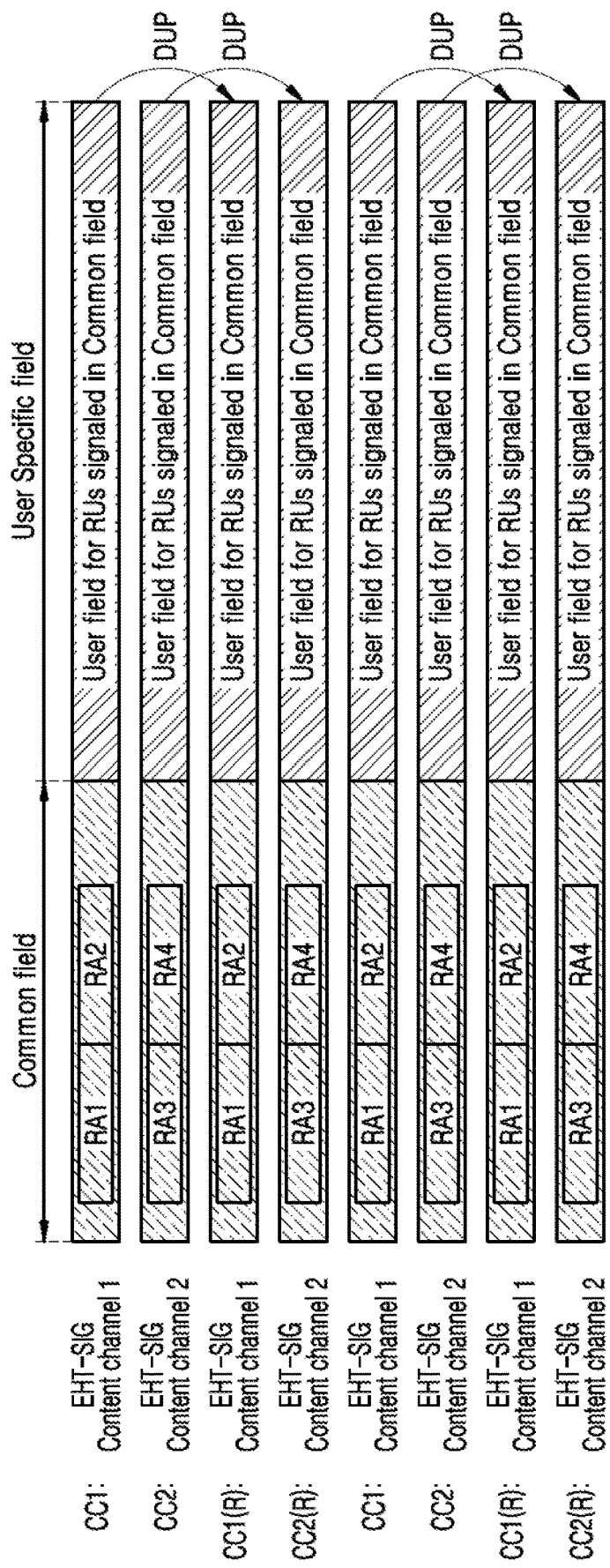
Figure 24A:
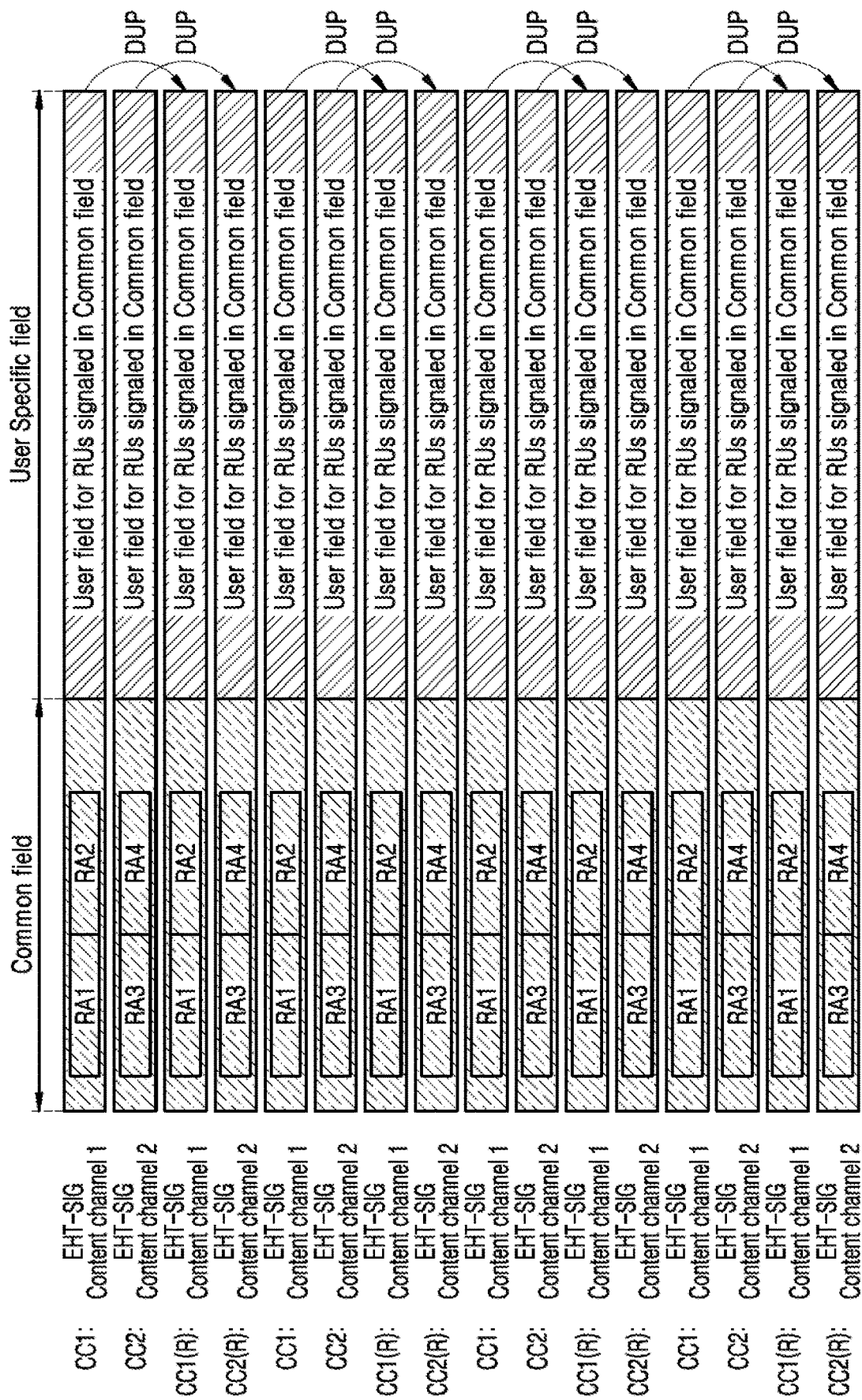

FIG. 11 is a diagram of an example in which multiple RUs are allocated to STAs in a 20 MHz OFDMA PPDU configured with small-size RUs. FIG. 12 is a diagram of an example in which multiple RUs are allocated to STAs in an 80 MHz OFDMA PPDU configured as large-size RUs. FIG. 13 is a diagram of an example in which OFDMA transmission is signaled via the EHT-SIG field in FIG. 10. FIG. 14 is a table for describing a method of determining the EHT-SIG field structure, according to an embodiment. FIGS. 15A through 15C are tables for describing an example of RU allocation indexing according to the RU Allocation subfield used in the non-compressed mode 1 in FIG. 14. FIGS. 16A through 16C are tables for describing another example of the RU allocation indexing according to the RU Allocation subfield used in the non-compressed mode 1 in FIG. 14. FIG. 17 is a table describing an example of the RU allocation indexing according to the RU Allocation subfield used in the non-compressed mode 2 in FIG. 14. FIG. 18 is a table describing a relationship between content channels of the EHT-SIG field in an 80 MHz EHT MU PPDU and the RU size based on the RU Allocation subfield in FIG. 17. FIGS. 19A and 19B are diagrams for describing an RU Allocation subfield indexing of each content channel in the 80 MHz EHT MU PPDU based on FIGS. 17 and 18. FIG. 20 is a table describing a relationship between content channels of the EHT-SIG field in a 160 MHz EHT MU PPDU and the RU size based on the RU Allocation subfield in FIG. 17. FIGS. 21A through 21C are diagrams describing the RU Allocation subfield indexing of each content channel in the 160 MHz EHT MU PPDU based on FIGS. 17 and 20. FIG. 22 is a table describing another example of the RU allocation indexing according to the RU Allocation subfield used in the non-compressed mode 2 in FIG. 14. FIG. 23 is a table describing a relationship between content channels of the EHT-SIG field in a 320 MHz EHT MU PPDU and the RU size based on the RU Allocation subfield in FIG. 22. FIGS. 24A through 21C are diagrams describing the RU Allocation subfield indexing of each content channel in the 320 MHz EHT MU PPDU based on FIGS. 22 and 23.

For example, it is assumed in the descriptions of the RU below that the RU described below includes any one of single RUs of 26-subcarrier RU, 52-subcarrier RU, 106-subcarrier RU, 242-subcarrier RU, 484-subcarrier RU, and 996-subcarrier RU, or any one of multiple RUs of 26+52-subcarrier RU (multiple RU of RU26+RU52), 52+26-subcarrier RU (multiple RU of RU52+RU26), 26+106-subcarrier RU (multiple RU of RU26+RU106), 106+26-subcarrier RU (multiple RU of RU106+RU26), 484+242-subcarrier RU (multiple RU of RU484+RU242), 996+484-subcarrier RU (multiple RU of RU996+RU484), 996+484+242-subcarrier RU (multi RU of RU996+RU484+RU242), 2×996+484-subcarrier RU (multi RU of RU996+RU996+RU484), 3×996-subcarrier RU (multi RU of RU996+RU996+RU996), and 3×996+484-subcarrier RUs (multiple RU of RU996+RU996+RU996+RU484). The RU according to the embodiment may further include other types of RUs other than the aforementioned single RU and multiple RUs, but for convenience of description, in the embodiment, the aforementioned single RU and multiple RUs will be described as examples.

First, referring to FIGS. 11 and 12, an example in which multiple RUs are allocated to STAs in the 20 MHz OFDMA PPDU configured with small-size RUs, and an example in which multiple RUs are allocated to STAs in the 80 MHz OFDMA PPDU configured with large-size RUs are illustrated.

For example, for the efficiency of multiple RU allocation, the RUs may be classified into small size RUs and large size RUs according to sizes thereof.

In this case, the small size RU may be any one of 26-subcarrier RU, 52-subcarrier RU, and 106-subcarrier RU, and the large size RU may be any one of 242-subcarrier RU, 484-subcarrier RU, and 996-subcarrier RU.

On the other hand, in the prior art, when 7 RUs are arranged in the 20 MHz OFDMA PPDU, 7 STAs each may be allocated with 1 RU and receive data from the AP.

However, in the embodiment, by using the multi-RU allocation method, a particular STA may be allocated with a multiple of RUs (that is, multiple RUs) and receive data from the AP.

Accordingly, as illustrated in FIG. 11 (a case of small size RU), a station STA-2 may receive data from the AP by being allocated with a multiple RU or RU26+RU52 (that is, 26-subcarrier RU+52-subcarrier RU), and a station STA-4 may receive data from the AP by being allocated with a multiple RU or RU52+RU26 (that is, 52-subcarrier RU+26-subcarrier RU). The other stations (that is, STA-1, STA-3, and STA-5) may be allocated with one RU and receive data from the AP, as in a general manner.

In addition, as illustrated in FIG. 12 (a case of large size RU), the station STA-2 may be allocated with a multiple RU or RU242+RU484 (a 242-subcarrier RU+484-subcarrier RU) and receive data from the AP. The remaining station (that is, STA-1) may be allocated with one RU and receive data from the AP, as in a general manner.

In this manner, when the STA receives data via multiple RUs, the corresponding STA may know which multiple RUs are allocated thereto by using the signaling field.

In this case, referring to FIG. 13, a process in which an RU allocated to each STA is signaled via the EHT-SIG field in the 80 MHz EHT MU PPDU is illustrated.

In the EHT MU PPDU, OFDMA transmission (that is, a method of transmitting data via a single RU or multiple RUs each allocated to multiple users) may be signaled via the EHT-SIG field.

In other words, in the EHT MU PPDU, the STA may know which single RU or multiple RUs are allocated thereto via the EHT-SIG field.

In this manner, when the EHT-SIG field signals the RU to be allocated to the STA in the EHT MU PPDU, the structure of the EHT MU PPDU may vary depending on whether the RU allocation information is included.

For example, the RU allocation information may be included in the RU Allocation subfield in the common field of the EHT-SIG field, and the common field may include common control information applied to at least one receiving device (for example, STA).

In this case, referring to FIG. 14, the structure of the EHT-SIG field may be largely divided into a compressed mode structure and a non-compressed mode structure depending on whether the OFDMA transmission is supported. In addition, the non-compressed mode structure may be divided into a non-compressed mode 1 structure and a non-compressed mode 2 structure according to the size of the RU allocated to the STA.

The common field may not be included in the EHT-SIG field having a compressed mode structure in which the OFDMA transmission is not supported. In this case, because each user (that is, each STA) is provided with data by the AP via the entire bandwidth of the EHT MU PPDU (that is, the entire frequency domain bandwidth of the data field), the OFDMA transmission method may not be supported. In addition, in this case, because it is not necessary to provide information about the RU allocation to each user, it may not be necessary that the RU Allocation subfield is in the EHT-SIG field. For example, a data transmission method using the entire bandwidth in this manner may include a full bandwidth SU-MIMO method or a full bandwidth MU-MIMO method. In addition, the data transmission method may include a partial bandwidth transmission method to which preamble puncturing is applied. A "punctured" subset of frequencies within a bandwidth are frequencies that are not used. Puncturing of frequencies may typically be implemented to avoid interference with another AP using those frequencies.

The common field may be included in the EHT-SIG field having the non-compressed mode structure in which the OFDMA transmission is supported. In this case, because each user (that is, each STA) is provided with data by the AP via different RUs from each other, the orthogonal frequency-division multiplexing access transmission method may be supported. In addition, in this case, to provide information about the RU allocation to each user, there may be an RU Allocation subfield in the common field in the EHT-SIG field.

For example, the non-compressed mode structure may be classified into a non-compressed mode 1 structure and a non-compressed mode 2 structure according to the size of the RU allocated to the STA.

Because the non-compressed mode 1 and the non-compressed mode 2 utilize different respective RU mapping information, a different RU Allocation subfield in each mode may be used to reduce a bit-width of the RU Allocation subfield.

When the size of the RU allocated to the STA is smaller than that of an RU with a predetermined size, e.g., the 242-subcarrier RU, the EHT-SIG field may have the non-compressed mode 1 structure. Hereafter, the 242-subcarrier RU may be used as an example of the RU with a predetermined size.

For example, when the EHT-SIG field has the non-compressed mode 1 structure, the MU-MIMO may not be applied to the RU allocated to the STA by using signaling of the corresponding EHT-SIG field. In addition, in this case, a single RU or multiple RUs of a small size may be allocated to a single STA. For example, the RU allocated to a single STA may include any one single RU of 26-subcarrier RU, 52-subcarrier RU, and 106-subcarrier RU, or any one multiple RU of 26+52-subcarrier RU, 52+26-subcarrier RU, 26+106-subcarrier RU, and 106+26-subcarrier RU. In addition, the basic granularity of the RU Allocation subfield included in the common field of the corresponding EHT-SIG field may be 20 MHz.

In this case, the basic unit may mean a basic unit of the RU Allocation subfield corresponding to the frequency domain of the data field.

On the other hand, when the size of the RU allocated to the STA is equal to or larger than that of the 242-subcarrier RU, the EHT-SIG field may have the non-compressed mode 2 structure.

For example, when the EHT-SIG field has the non-compressed mode 2 structure, for the RU allocated to the STA by using signaling of the corresponding EHT-SIG field, the MU-MIMO (that is, both of the MU-MIMO and a non-MU-MIMO (for example, SU-MIMO)) may be applied. In addition, in this case, a single RU or multiple RUs of a large size may be allocated to a single STA or multiple STAs. For example, the RU allocated to a single STA or multiple STAs may include any one single RU of 242-subcarrier RU, 484-subcarrier RU, and 996-subcarrier RU, or any one multiple RUs of 484+242-subcarrier RU, 996+484-subcarrier RU, 996+484+242-subcarrier RU, 2×996+484-subcarrier RU, 3×996-subcarrier RU, and 3×996+484-subcarrier RU. In addition, the basic granularity of the RU Allocation subfield included in the common field of the corresponding EHT-SIG field may be 40 MHz or 80 MHz.

For further explanation, when the AP performs the OFDMA transmission by allocating only RUs having a size of 242-subcarrier RU or larger to the STA, the basic unit of the RU Allocation subfield corresponding to the frequency domain of the data field may not need to be 20 MHz. In other words, in this case, even when the basic unit of the RU Allocation subfield is 40 MHz or greater, the EHT-SIG field may sufficiently indicate the RU allocation information to the STA.

In other words, when the basic unit of the RU Allocation subfield is set to 40 MHz or greater for a large size RU of 242-subcarrier RU or larger, the number of RU Allocation subfields in the EHT-SIG field may be reduced compared to the number of the RU Allocation subfield in the 802.11ax HE-SIG-B. Furthermore, the overhead of the EHT-SIG field may be reduced by reducing the number of RU Allocation subfields.

For example, in the non-compressed mode 2, the basic unit of the RU Allocation subfield may be determined based on the bandwidth of the EHT MU PPDU, and detailed descriptions thereof will be given later.

In this manner, the structure of the EHT-SIG field that may be configured as any one of the three modes described above may be signaled by a particular field in the U-SIG field (for example, the EHT-SIG compression field in the above-described U-SIG field).

The 'EHT-SIG compression field' may be included in the U-SIG field of the EHT MU PPDU as described above, and may be a field indicating whether there is a common field in the EHT-SIG field.

For example, the 'EHT-SIG compression field' may include 1 bit like the 'HE-SIG-B compression field' of 802.11ax, but may include 2 bits unlike the 'HE-SIG-B compression field' of 802.11ax.

For example, when the EHT-SIG compression field includes 1 bit, all three modes illustrated in FIG. 14 may not be indicated only by the EHT-SIG compression field.

Accordingly, in this case, by using a combination of 1 bit of the EHT-SIG compression field and any 1 bit of another field in the U-SIG field (for example, 1 bit of a field indicating the PPDU type in the U-SIG field; hereinafter, to be referred to as '1 bit of a particular field'), the three modes illustrated in FIG. 14 may be signaled.

When the structure of the EHT-SIG field is the compressed mode structure (that is, when the RU allocation information is not included in the EHT-SIG field), a combination of 1 bit of the EHT-SIG compression field and 1 bit of a particular field may represent a first binary value (interchangeably, "first value").

For example, 1 bit of the EHT-SIG compression field may be 0, 1 bit of a particular field may also be 0, and then, the first value may be '00' ('0' in a decimal system).

For example, in this case, data to be transmitted by a transmitting device to at least one receiving device may be transmitted via the entire frequency domain bandwidth of the data field in the EHT MU PPDU.

Next, when the structure of the EHT-SIG field is the non-compressed mode 1 structure (that is, the RU allocation information is included in the EHT-SIG field, and the size of the RU allocated to the STA is smaller than a 242-subcarrier RU), the combination of 1 bit of the EHT-SIG compression field and 1 bit of a particular field may indicate a second value.

For example, 1 bit of the EHT-SIG compression field may be 1, 1 bit of a particular field may be 0, and then, the second value may be '10' (that is, '2').

For example, in this case, at least one RU having a size smaller than the 242-subcarrier RU may be arranged in the frequency domain of the data field in the EHT MU PPDU based on the RU allocation information. In addition, data transmitted from a transmitting device to each of at least one receiving device may be transmitted via any one of the at least one RU.

Lastly, when the structure of the EHT-SIG field is the non-compressed mode 2 structure (that is, the RU allocation information is included in the EHT-SIG field, and the size of the RU allocated to the STA is larger than a 242-subcarrier RU), the combination of 1 bit of the EHT-SIG compression field and 1 bit of a particular field may indicate a third value.

For example, 1 bit of the EHT-SIG compression field may be 1, 1 bit of a particular field may also be 1, and then, the third value may be '11' (that is, '3').

For example, in this case, at least one RU having a size larger than the 242-subcarrier RU may be arranged in the frequency domain of the data field in the EHT MU PPDU based on the RU allocation information. In addition, data transmitted from a transmitting device to each of at least one receiving device may be transmitted via any one of the at least one RU.

On the other hand, when the EHT-SIG compression field includes 2 bits, all three modes illustrated in FIG. 14 may be indicated by the EHT-SIG compression field. For example, in this case, a binary value of the EHT-SIG compression field, represented by the 2 bits, may be determined based on whether the RU allocation information is included and the size of the RU allocated to a receiving device (for example, STA).

When the structure of the EHT-SIG field is the compressed mode structure (that is, when the RU allocation information is not included in the EHT-SIG field), the binary value represented by a combination of the 2 bits of the EHT-SIG compression field may indicate the first binary value.

For example, 2 bits of the EHT-SIG compression field may be '00', and the corresponding first value in a decimal system may be '0'.

For example, in this case, data to be transmitted from a transmitting device to at least one receiving device may be transmitted via the entire frequency domain bandwidth of the data field in the EHT MU PPDU.

Next, when the structure of the EHT-SIG field is the non-compressed mode 1 structure (that is, the RU allocation information is included in the EHT-SIG field, and the size of the RU allocated to the STA is smaller than a 242-subcarrier RU), the 2 bits of the EHT-SIG compression field may indicate the second value.

For example, the 2 bits of the EHT-SIG compression field may be '10', and the corresponding second value may be '2'.

For example, in this case, at least one RU having a size smaller than the 242-subcarrier RU may be arranged in the frequency domain of the data field in the EHT MU PPDU based on the RU allocation information. In addition, data transmitted from a transmitting device to each of at least one receiving device may be transmitted via any one of the at least one RU.

Finally, when the structure of the EHT-SIG field is the non-compressed mode 2 structure (that is, the RU allocation information is included in the EHT-SIG field, and the size of the RU allocated to the STA is equal to or larger than a 242-subcarrier RU), the 2 bits of the EHT-SIG compression field may indicate the third value.

For example, the 2 bits of the EHT-SIG compression field may be '11', and the corresponding third value may be '3'.

For example, in this case, at least one RU having a size equal to or larger than the 242-subcarrier RU may be arranged in the frequency domain of the data field in the EHT MU PPDU based on the RU allocation information. In addition, data transmitted from a transmitting device to each of at least one receiving device may be transmitted via any one of the at least one RU.

As described above, the structure of the EHT-SIG field may be signaled by a particular field in the U-SIG field (for example, the EHT-SIG compression field in the aforementioned U-SIG field), and hereinafter, the RU Allocation subfield according to each mode will be described.

First, referring to FIGS. 15A through 15C, tables describing an example of the RU allocation indexing according to the RU Allocation subfield used in the non-compressed mode 1 in FIG. 14.

For example, in the case of the RU Allocation subfield illustrated in FIGS. 15A through 15C, the basic unit may be 20 MHz, and include 8 bits (B7, B6, B5, B4, B3, B2, B1, B0), and may be reconstructed based on the RU Allocation subfield (for example, the RU Allocation subfield in FIG. 8) used in the existing 802.11ax (HE). In other words, in the case of the RU Allocation subfield illustrated in FIGS. 15A through 15C, by using the indices indicated as 'Reserved' in the RU Allocation subfield of the existing 802.11ax (HE) (for example, 116-127, 216-226), multiple RUs having a size smaller than a 242-subcarrier RU (for example, 26+52-subcarrier RU, 52+26-subcarrier RU, 26+106-subcarrier RU, 106+26-subcarrier RU) may be additionally illustrated. In addition, the MU-MIMO may not be applied to newly added multiple RUs.

On the other hand, referring to FIGS. 16A through 16C, tables describing another example of the RU allocation indexing according to the RU Allocation subfield used in the non-compressed mode 1 in FIG. 14.

For example, unlike the RU Allocation subfield illustrated in FIGS. 5A through 15C, in the case of the RU Allocation subfield illustrated in FIGS. 16A through 16C, the basic unit may be 20 MHz and include 6 bits (B5, B4, B3, B2, B1, B0), and without applying the MU-MIMO, may indicate a single RU configured with a size smaller than the 242-subcarrier RU or multiple RUs (for example, 26+52-subcarrier RU, 52+26-subcarrier RU, 26+106-subcarrier RU, and 106+26-subcarrier RU).

In this manner, the number of bits of the RU Allocation subfield illustrated in FIGS. 16A through 16C may be smaller than the number of bits of the RU Allocation subfield illustrated in FIGS. 15A through 15C. Accordingly, when the RU Allocation subfield illustrated in FIGS. 16A through 16C is used for the EHT-SIG field in the non-compressed mode 1 in FIG. 14, the overhead of the EHT-SIG field compared to the RU Allocation subfield illustrated in FIGS. 15A through 15C may be reduced.

On the other hand, referring to FIG. 17, a table describing an example of the RU allocation indexing according to the RU Allocation subfield used in the non-compressed mode 2 in FIG. 14.

For example, in the case of the RU Allocation subfield illustrated in FIG. 17, the basic unit may be 40 MHz, and include 8 bits (B7, B6, B5, B4, B3, B2, B1, B0). In other words, in the non-compressed mode 2, because the RU Allocation subfield does not need to indicate an entry for a single RU or multiple RUs of a small size, the basic unit of the RU Allocation subfield may be set to 40 MHz instead of 20 MHz.

For example, in the embodiment, to support the non-compressed mode 2 of the 160 MHz EHT MU PPDU, the basic unit of the RU Allocation subfield may be designed as 40 MHz. In addition, in this case, only 4 RU Allocation subfields may need be transmitted to the STA via the EHT-SIG field. However, as in the existing 802.11ax (HE) standard, when the basic unit of the RU Allocation subfield is designed as 20 MHz, a total of 8 RU Allocation subfields may need to be transmitted to the STA via the EHT-SIG field.

In other words, in the embodiment, by increasing the basic unit of the RU Allocation subfield in the non-compressed mode 2 compared to the existing 802.11ax (HE) standard, the number of RU Allocation subfields in the EHT-SIG field may be reduced compared to the prior art, and in this manner, the overhead of the EHT-SIG field may be reduced.

For example, in the non-compressed mode 2, the basic unit of the RU Allocation subfield may be determined based on the bandwidth of the EHT MU PPDU.

For example, when the bandwidth of the EHT MU PPDU is 80 MHz or 160 MHz, the basic unit of the RU Allocation subfield may be set to 40 MHz (that is, the minimum size of the RU may be set to 242-subcarrier RU). In addition, when the bandwidth of the EHT MU PPDU is 240 MHz or 320 MHz, the basic unit of the RU Allocation subfield may be set to 80 MHz (that is, the minimum size of the RU may be set to 484-subcarrier RU).

Accordingly, in FIG. 17 in which the bandwidth of the EHT MU PPDU is illustrated as 80 MHz or 160 MHz, the basic unit of the RU Allocation subfield may be set to 40 MHz (that is, the minimum size of the RU may be set to 242-subcarrier RU).

In this case, referring to FIG. 18, a relationship between the SIG content channel and the RU size is illustrated for a situation in which the bandwidth of the EHT MU PPDU is 80 MHz, and two types of EHT-SIG content channels exist (that is, an EHT-SIG content channel 1 and an EHT-SIG content channel 2).

For example, as illustrated in FIG. 19A, when the bandwidth of the EHT MU PPDU is 80 MHz, the total number of EHT-SIG content channels in the EHT-SIG field may be four. In addition, in the four EHT-SIG content channels, there may be an EHT-SIG content channel 1 CC1, an EHT-SIG content channel 2 CC2, an EHT-SIG content channel 1 replica (R) CC1(R), and an EHT-SIG content channel 2 CC2(R), and each of the EHT-SIG content channels may be arranged in various orders in the EHT-SIG field.

However, for convenience of description, in the embodiment, an example in which four EHT-SIG content channels or the EHT-SIG content channel 1 CC1 (first), the EHT-SIG content channel 2 CC2 (second), the EHT-SIG content channel 1 CC1(R) (third), and the EHT-SIG content channel 2 CC2(R) (fourth) are arranged in order (e.g., CC1-CC2-CC1(R)-CC2(R) structure) will be described.

When the bandwidth of the EHT MU PPDU is 80 MHz and the basic unit of the RU Allocation subfield in the EHT-SIG field is 40 MHz, the number of RU Allocation subfields in each EHT-SIG content channel may be one. In other words, the number of RU Allocation subfields in the common field of each EHT-SIG content channel may be one. Accordingly, the RU arrangement allocated to the 80 MHz bandwidth may be illustrated by only the RU Allocation subfield of each of the EHT-SIG content channel 1 and the EHT-SIG content channel 2.

However, in the embodiment, the reliability of each content channel may be improved by overlapping and accumulating each EHT-SIG content channel by using duplicate (DUP) of each of the EHT-SIG content channel 1 and the EHT-SIG content channel 2.

Because the RU Allocation subfield of the EHT-SIG content channel 1 CC1(R) (third) is the DUP of the RU Allocation subfield of the EHT-SIG content channel 1 CC1 (first), they may be the same as each other. In addition, because the RU Allocation subfield of the EHT-SIG content channel 2 CC2(R) (fourth) is the DUP of the RU Allocation subfield of the EHT-SIG content channel 2 CC2 (second), they may be the same as each other.

Referring again to FIG. 18, various examples of the relationship between the EHT-SIG content channel, the RU Allocation subfield, and the RU arrangement are illustrated based on the above description.

For example, when both RUs that are indexed by RU Allocation subfields RA1 and RA2 in each of the EHT-SIG content channels CC1 and CC2 are '242-subcarrier RU's, an index of each of the RU Allocation subfield RA1 and the RU Allocation subfield RA2 may be '0'.

When the index of the RU Allocation subfield RA1 is '0' (that is, '0' in FIG. 17), as illustrated in 'Case 1' in FIG. 18, cases of 242RU1 and 242RU3 may be referred to. In addition, when the index of the RU Allocation subfield RA2 is '0' (that is, '0' in FIG. 17), as illustrated in 'Case 1' in FIG. 18, cases of 242RU2 and 242RU4 may be referred to.

On the other hand, for example, when the RU indexed by the RU Allocation subfield RA1 in the EHT-SIG content channel 1 CC1 is 484+242-subcarrier RU, the index of the RU Allocation subfield RA1 may be '224'. However, when the index of the RU Allocation subfield RA1 is '224' (that is, '224' in FIG. 17), as illustrated in 'Case 2' in FIG. 18, the case may be limited to a case of 484RU1+242RU3. For example, in this case, the RU indexed by the RU Allocation subfield RA2 in the EHT-SIG content channel 2 CC2 may be, for example, 'empty (none)' or 'RU242 (that is, 242-subcarrier RU)'.

In addition, for example, when a size of the RU indexed by the RU Allocation subfield RA2 in the EHT-SIG content channel 2 CC2 is 242+484-subcarrier RU, the index of the RU Allocation subfield RA2 may be '216'. However, when the index of the RU Allocation subfield RA2 is '216' (that is, '216' in FIG. 17), as illustrated in 'Case 3' in FIG. 18, the case may be limited to a case of 242RU1+484RU3. For example, in this case, the RU indexed by the RU Allocation subfield RA1 in the EHT-SIG content channel 1 CC1 may be, for example, 'empty (none)' or 'RU242 (that is, 242-subcarrier RU)'.

For example, information about '484RU1' may be indexed only by EHT-SIG content channel 1 CC1 regardless of whether '484RU1' is a single RU or multiple RUs. In addition, information about '484RU2' may be indexed only by EHT-SIG content channel 2 CC2 regardless of whether '484RU2' is a single RU or multiple RUs. However, in FIG. 18, for convenience of description, a case in which '484RU' is included in multiple RUs will be described as an example.

In this manner, when the bandwidth of the EHT MU PPDU is 80 MHz and the basic unit of the RU Allocation subfield is 40 MHz, as illustrated in FIG. 19B, the RU Allocation subfield indexing of each EHT-SIG content channel may be configured. In addition, in FIG. 19B, the RU allocation arrangement according to the RU Allocation subfield indexing is illustrated. For example, in FIG. 19B, an area marked as MRU may be an area indicating a case to which multiple RUs are allocated.

As described above, the RU arrangement indexing according to the RU Allocation subfield of the 80 MHz EHT MU PPDU in the non-compressed mode 2 has been examined. Referring to FIG. 20, the bandwidth of the EHT MU PPDU may be 160 MHz, and a relationship between the EHT-SIG content channel and the RU size are illustrated in a situation in which there are two types of the EHT-SIG content channel as the EHT-SIG content channel 1 and the EHT-SIG content channel 2.

For example, as illustrated in FIG. 21A, when the bandwidth of the EHT MU PPDU is 160 MHz, the total number of EHT-SIG content channels in the EHT-SIG field may be eight. In addition, in the eight EHT-SIG content channels, there may be two each of the EHT-SIG content channel 1 CC1, the EHT-SIG content channel 2 CC2, a replica CC1(R) of the EHT-SIG content channel 1 CC1, and a replica CC2(R) of the EHT-SIG content channel 2 CC2.

However, for convenience of description, in the embodiment, a case in which eight EHT-SIG content channels or the EHT-SIG content channel 1 CC1 (first), the EHT-SIG content channel 2 CC2 (second), an EHT-SIG content channel 1 CC1(R) (third), and an EHT-SIG content channel 2 CC2(R) (fourth) are repeatedly arranged in order will be described as an example.

On the other hand, when the bandwidth of the EHT MU PPDU is 160 MHz, and the basic unit of the RU Allocation subfield in the EHT-SIG field is 40 MHz, the number of RU Allocation subfields in each EHT-SIG content channel may be two. In other words, the number of RU Allocation subfields in the common field of each EHT-SIG content channel may be two.

In other words, the EHT-SIG content channel 1 CC1 may include two RU Allocation subfields, that is, RA1 and RA2, and the EHT-SIG content channel 2 CC2 may also include two RU Allocation subfields, that is, RA3 and RA4. In addition, because the replica CC1(R) of the EHT-SIG content channel 1 CC1 also includes two RU Allocation subfields RA1 and RA2, and the replica CC2(R) of the EHT-SIG content channel 2 CC2 also includes two RU Allocation subfields RA3 and RA4, the reliability of each content channel may be improved.

In addition, the first RU Allocation subfield RA1 of the EHT-SIG content channel 1 CC1 may index the RU allocation information of a first 20 MHz section and a third 20 MHz section of the 160 MHz bandwidth, and the second RU Allocation subfield RA2 of the EHT-SIG content channel 1 CC1 may index the RU allocation information of a fifth 20 MHz section and a seventh 20 MHz section of the 160 MHz bandwidth via a replication channel CC1(R). In addition, the third RU Allocation subfield RA3 of the EHT-SIG content channel 2 CC2 may index the RU allocation information of a second 20 MHz section and a fourth 20 MHz section of the 160 MHz bandwidth, and the fourth RU Allocation subfield RA4 of the EHT-SIG content channel 2 CC2 may index the RU allocation information of a sixth 20 MHz section and an eighth (the last) 20 MHz section of the 160 MHz bandwidth via a replication channel CC2(R).

Based on this principle, various examples of the relationship between the EHT-SIG content channel, the RU Allocation subfield, and the RU arrangement will be described with reference to FIG. 20 again.

For example, when both RUs that are indexed by RU Allocation subfields RA1 through RA4 in each of the EHT-SIG content channels CC1 and CC2 are '242-subcarrier RU's, an index of each of the RU Allocation subfields RA1 through RA4 may be '0'.

When the index of the RU Allocation subfield RA1 is '0' (that is, '0' in FIG. 18), the cases of 242RU1 and 242RU3 may be referred to. In addition, when the index of the RU Allocation subfield RA2 is '0' (that is, '0' in FIG. 18), the cases of 242RU5 and 242RU7 may be referred to. In addition, when the index of the RU Allocation subfield RA3 is '0' (that is, '0' in FIG. 18), the cases of 242RU2 and 242RU4 may be referred to. In addition, when the index of the RU Allocation subfield RA4 is '0' (that is, '0' in FIG. 18), the cases of 242RU6 and 242RU8 may be referred to.

On the other hand, for example, when the RU indexed by the RU Allocation subfield RA1 in the EHT-SIG content channel 1 CC1 is 484+242-subcarrier RU, the index of the RU Allocation subfield RA1 may be '224'. However, when the index of the RU Allocation subfield RA1 is '224' (that is, '224' in FIG. 18), the case may be limited only to 484RU1+242RU3. In addition, for example, when the RU indexed by the RU Allocation subfield RA3 in the EHT-SIG content channel 2 CC2 is 242+484-subcarrier RU, the index of the RU Allocation subfield RA3 may be '216'. However, when the index of the RU Allocation subfield RA3 is '216' (that is, '216' in FIG. 18), the case may be limited only to 242RU2+484RU1.

For example, information about '484RU1' may be indexed only by EHT-SIG content channel 1 CC1 regardless of whether '484RU1' is a single RU or multiple RUs. In addition, information about '484RU2' may be indexed only by EHT-SIG content channel 2 CC2 regardless of whether '484RU2' is a single RU or multiple RUs. However, in FIG. 20, for convenience of description, a case in which '484RU' is included in multiple RUs will be described as an example.

Similarly, when the RU indexed by the RU Allocation subfield RA2 in the replica CC1(R) of the EHT-SIG content channel 1 CC1 is 484+242-subcarrier RU, the index of the RU Allocation subfield RA1 may be '224'. However, when the index of the RU Allocation subfield RA2 is '224' (that is, '224' in FIG. 18), the case may be limited only to 484RU3+242RU7. In addition, when the RU indexed by the RU Allocation subfield RA4 in the replica CC2(R) of the EHT-SIG content channel 2 CC2 is 242+484-subcarrier RU, the index of the RU Allocation subfield RA4 may be '216'. However, when the index of the RU Allocation subfield RA4 is '216' (that is, '216' in FIG. 18), the case may be limited only to 242RU6+484RU4.

For example, information about '484RU3' may be indexed only by the replica CC1(R) of the EHT-SIG content channel 1 CC1 regardless of whether '484RU3' is a single RU or multiple RU. In addition, information about '484RU4' may be indexed only by the replica CC2(R) of the EHT-SIG content channel 2 CC2 regardless of whether '484RU4' is a single RU or multiple RU. However, in FIG. 20, for convenience of description, a case in which '484RU' is included in multiple RUs will be described as an example.

In addition, for example, when the RU indexed by the RU Allocation subfield RA1 in the EHT-SIG content channel 1 CC1 is 996-subcarrier RU, the index of the RU Allocation subfield RA1 may be '232'. However, when the index of the RU Allocation subfield RA1 is '232' (that is, '232' in FIG. 18), the index of the RU Allocation subfield RA1 may be limited to 996RU1 (that is, 996RU of primary 80 MHz). On the other hand, for example, when the RU indexed by the RU Allocation subfield RA3 in the EHT-SIG content channel 2 CC2 is 996-subcarrier RU, the index of the RU Allocation subfield RA3 may be '232'. However, when the index of the RU Allocation subfield RA3 is '232' (that is, '232' in FIG. 18), the index of the RU Allocation subfield RA3 may be limited to 996RU2 (that is, 996RU of secondary 80 MHz).

Similarly, for example, when the RU indexed by the RU Allocation subfield RA2 in the replica CC1(R) of the EHT-SIG content channel 1 CC1 is 996-subcarrier RU, the index of the RU Allocation subfield RA2 may be '232'. However, when the index of the RU Allocation subfield RA2 is '232' (that is, '232' in FIG. 18), the index of the RU Allocation subfield RA1 may be limited to 996RU1 (that is, 996RU of primary 80 MHz). On the other hand, for example, when the RU indexed by the RU Allocation subfield RA4 in the replica CC2(R) of the EHT-SIG content channel 2 CC2 is 996-subcarrier RU, the index of the RU Allocation subfield RA4 may be '232'. However, when the index of the RU Allocation subfield RA4 is '232' (that is, '232' in FIG. 18), the index of the RU Allocation subfield RA3 may be limited to 996RU2 (that is, 996RU of secondary 80 MHz).

In this manner, when the bandwidth of the EHT MU PPDU is 160 MHz and the basic unit of the RU Allocation subfield is 40 MHz, as illustrated in FIGS. 21B and 21C, the RU Allocation subfield indexing of each EHT-SIG content channel may be configured. In addition, in FIGS. 21B and 21C, the RU allocation arrangement according to the RU Allocation subfield indexing is illustrated. For example, in FIGS. 21B and 21C, an area marked as MRU may be an area indicating a case to which multiple RUs are allocated.

In summary, in the embodiment, because 40 MHz is set as a basic unit of the RU Allocation subfield of 80 MHz or 160 MHz EHT MU PPDU in the non-compressed mode 2, the overhead of a signaling field (that is, the EHT-SIG field) may be reduced compared to a configuration method of the RU Allocation subfield according to the conventional 802.11ax (HE) standard.

On the other hand, in FIG. 22 in which the bandwidth of the EHT MU PPDU is illustrated as 240 MHz or 320 MHz, the basic unit of the RU Allocation subfield may be set to 80 MHz (that is, the minimum size of the RU may be set to 484-subcarrier RU).

In this case, referring to FIG. 23, a relationship between the SIG content channel and the RU size is illustrated for a situation in which the bandwidth of the EHT MU PPDU is 320 MHz, and two types of EHT-SIG content channels exist (that is, an EHT-SIG content channel 1 and an EHT-SIG content channel 2).

For example, as illustrated in FIG. 24A, when the bandwidth of the EHT MU PPDU is 320 MHz, the total number of EHT-SIG content channels in the EHT-SIG field may be sixteen. In addition, in the sixteen EHT-SIG content channels, there may be four each of the EHT-SIG content channel 1 CC1, the EHT-SIG content channel 2 CC2, a replica CC1(R) of the EHT-SIG content channel 1 CC1, and a replica CC2(R) of the EHT-SIG content channel 2 CC2.

However, for convenience of description, in the embodiment, a case in which sixteen EHT-SIG content channels or the EHT-SIG content channel 1 CC1 (first), the EHT-SIG content channel 2 CC2 (second), the EHT-SIG content channel 1 CC1(R) (third), and the EHT-SIG content channel 2 CC2(R) (fourth) are repeatedly arranged in order will be described as an example.

When the bandwidth of the EHT MU PPDU is 320 MHz, and the basic unit of the RU Allocation subfield in the EHT-SIG field is 80 MHz, the number of RU Allocation subfields in each EHT-SIG content channel may be two. In other words, the number of RU Allocation subfields in the common field of each EHT-SIG content channel may be two.

In other words, the EHT-SIG content channel 1 CC1 may include two RU Allocation subfields, e.g., RA1 and RA2, and the EHT-SIG content channel 2 CC2 may also include two RU Allocation subfields, e.g., RA3 and RA4. In addition, because the replica CC1(R) of the EHT-SIG content channel 1 CC1 also includes two RU Allocation subfields RA1 and RA2, and the replica CC2(R) of the EHT-SIG content channel 2 CC2 also includes two RU Allocation subfields RA3 and RA4, the reliability of each content channel may be improved.

In addition, the first RU Allocation subfield RA1 of the EHT-SIG content channel 1 CC1 may index the RU allocation information of a first 40 MHz section and a third 40 MHz section of the 320 MHz bandwidth, and the second RU Allocation subfield RA2 of the EHT-SIG content channel 1 CC1 may index the RU allocation information of a fifth 40 MHz section and a seventh 40 MHz section of the 320 MHz bandwidth via a replication channel CC1(R). In addition, the third RU Allocation subfield RA3 of the EHT-SIG content channel 2 CC2 may index the RU allocation information of a second 40 MHz section and a fourth 40 MHz section of the 320 MHz bandwidth, and the fourth RU Allocation subfield RA4 of the EHT-SIG content channel 2 CC2 may index the RU allocation information of a sixth 40 MHz section and an eighth (the last) 40 MHz section of the 320 MHz bandwidth via a replication channel CC2(R).

Based on this principle, various examples of the relationship between the EHT-SIG content channel, the RU Allocation subfield, and the RU arrangement will be described with reference to FIG. 23 again.

For example, when both RUs that are indexed by RU Allocation subfields RA1 through RA4 in each of the EHT-SIG content channels CC1 and CC2 are '484-subcarrier RU's, an index of each of the RU Allocation subfields RA1 through RA4 may be '0'.

When the index of the RU Allocation subfield RA1 is '0' (that is, '0' in FIG. 22), the cases of 484RU1 and 484RU3 may be referred to. In addition, when the index of the RU Allocation subfield RA2 is '0' (that is, '0' in FIG. 22), the cases of 484RU5 and 484RU7 may be referred to. In addition, when the index of the RU Allocation subfield RA3 is '0' (that is, '0' in FIG. 22), the cases of 484RU2 and 484RU4 may be referred to. In addition, when the index of the RU Allocation subfield RA4 is '0' (that is, '0' in FIG. 22), the cases of 484RU6 and 484RU8 may be referred to.

On the other hand, for example, when the RU indexed by the RU Allocation subfield RA1 in the EHT-SIG content channel 1 CC1 is 996+484-subcarrier RU, the index of the RU Allocation subfield RA1 may be '224'. However, when the index of the RU Allocation subfield RA1 is '224' (that is, '224' in FIG. 22), the case may be limited only to 996RU1+484RU3. In addition, for example, when the RU indexed by the RU Allocation subfield RA3 in the EHT-SIG content channel 2 CC2 is 484+996-subcarrier RU, the index of the RU Allocation subfield RA3 may be '216'. However, when the index of the RU Allocation subfield RA3 is '216' (that is, '216' in FIG. 22), the case may be limited only to 484RU2+996RU2.

For example, information about '996RU1' may be indexed only by EHT-SIG content channel 1 CC1 regardless of whether '996RU1' is a single RU or multiple RU. In addition, information about '996RU2' may be indexed only by EHT-SIG content channel 2 CC2 regardless of whether '996RU2' is a single RU or multiple RUs. However, in FIG. 23, for convenience of description, a case in which '996RU' is included in a multiple RU will be described as an example.

Similarly, when the RU indexed by the RU Allocation subfield RA2 in the replica CC1(R) of the EHT-SIG content channel 1 CC1 is 996+484-subcarrier RU, the index of the RU Allocation subfield RA1 may be '224'. However, when the index of the RU Allocation subfield RA2 is '224' (that is, '224' in FIG. 22), the case may be limited only to 996RU3+484RU7. In addition, when the RU indexed by the RU Allocation subfield RA4 in the replica CC2(R) of the EHT-SIG content channel 2 CC2 is 484+996-subcarrier RU, the index of the RU Allocation subfield RA4 may be '216'. However, when the index of the RU Allocation subfield RA4 is '216' (that is, '216' in FIG. 22), the case may be limited only to 484RU6+996RU4.

For example, information about '996RU3' may be indexed only by the replica CC1(R) of the EHT-SIG content channel 1 CC1 regardless of whether '996RU3' is a single RU or multiple RU. In addition, information about '996RU4' may be indexed only by the replica CC2(R) of the EHT-SIG content channel 2 CC2 regardless of whether '996RU4' is a single RU or multiple RU. However, in FIG. 23, for convenience of description, a case in which '996RU' is included in a multiple RU will be described as an example.

In addition, for example, when the RU indexed by the RU Allocation subfield RA1 in the EHT-SIG content channel 1 CC1 is 2×996-subcarrier RU, the index of the RU Allocation subfield RA1 may be '232'. However, when the index of the RU Allocation subfield RA1 is '232' (that is, '232' in FIG. 22), the index of the RU Allocation subfield RA1 may be limited to 2×996RU1 (that is, 2×996RU of primary 160 MHz). On the other hand, for example, when the RU indexed by the RU Allocation subfield RA3 in the EHT-SIG content channel 2 CC2 is 2×996-subcarrier RU, the index of the RU Allocation subfield RA3 may be '232'. However, when the index of the RU Allocation subfield RA3 is '232' (that is, '232' in FIG. 22), the index of the RU Allocation subfield RA1 may be limited to 2×996RU2 (that is, 2×996RU of secondary 160 MHz).

Similarly, for example, when the RU indexed by the RU Allocation subfield RA2 in the replica CC1(R) of the EHT-SIG content channel 1 CC1 is 2×996-subcarrier RU, the index of the RU Allocation subfield RA2 may be '232'. However, when the index of the RU Allocation subfield RA2 is '232' (that is, '232' in FIG. 22), the index of the RU Allocation subfield RA1 may be limited to 2×996RU1 (that is, 2×996RU of primary 160 MHz). On the other hand, for example, when the RU indexed by the RU Allocation subfield RA4 in the replica CC2(R) of the EHT-SIG content channel 2 CC2 is 2×996-subcarrier RU, the index of the RU Allocation subfield RA4 may be '232'. However, when the index of the RU Allocation subfield RA4 is '232' (that is, '232' in FIG. 22), the index of the RU Allocation subfield RA1 may be limited to 2×996RU2 (that is, 2×996RU of secondary 160 MHz).

In this manner, when the bandwidth of the EHT MU PPDU is 320 MHz and the basic unit of the RU Allocation subfield is 80 MHz, as illustrated in FIGS. 24B and 24C, the RU Allocation subfield indexing of each EHT-SIG content channel may be configured. In addition, in FIGS. 24B and 24C, the RU allocation arrangement according to the RU Allocation subfield indexing is illustrated. For example, in FIGS. 24B and 24C, an area marked as MRU may be an area indicating a case to which multiple RUs are allocated.

In summary, in the embodiment, because 80 MHz is set as a basic unit of the RU Allocation subfield of 240 MHz or 320 MHz EHT MU PPDU in the non-compressed mode 2, the overhead of a signaling field (that is, the EHT-SIG field) may be reduced compared to a configuration method of the RU Allocation subfield according to the conventional 802.11ax (HE) standard.

As described above, according to embodiments of the inventive concept, by using an apparatus and method for reducing overhead of a signaling field in the PPDU in the WLAN system, the multiple RU may be efficiently allocated to the user. Moreover, spectrum efficiency and a data transmission rate on the physical layer may be improved.

Various functions described above may be implemented or supported by artificial intelligence technology or one or more computer programs. Each of the computer programs may include computer-readable program code and may be executed on a computer-readable recording medium. The terms "application" and "program" refer to one or more computer programs, software components, instruction sets, procedures, functions, objects, classes, instances, related data, or portions thereof suitable for implementation of suitable computer-readable program code. The term "computer-readable program code" includes all types of computer code including source code, object code, and executable code. The term "computer-readable recording medium" includes all types of media accessed by a computer, such as read-only memory (ROM), random access memory (RAM), a hard disk drive, a compact disk (CD), a digital video disk (DVD), or some other type of memory. The term "non-transitory" computer-readable recording media excludes wired, wireless, optical, or other communication links that transmit transient electrical signals or other signals. The term "non-transitory computer-readable recording media" includes media on which data can be permanently stored, and media on which data can be stored and later overwritten, such as a rewritable optical disk or erasable memory device.

While the inventive concept has been particularly shown and described with reference to embodiments thereof, it will be understood that various changes in form and details may be made therein without departing from the spirit and scope of the following claims.

What is claimed is:

1. A baseband circuit in a transmitting device of a wireless local area network (WLAN), the baseband circuit comprising:
   a storage;
   at least one processor coupled to the storage and configured to generate a physical layer convergence protocol (PLCP) protocol data unit (PPDU) comprising a preamble and a payload,
   wherein,
   the preamble comprises a plurality of training fields and a plurality of signaling fields,
   the payload comprises a data field,
   a first signaling field among the plurality of signaling fields comprises a compression mode field indicating whether resource unit (RU) allocation information designated for at least one receiving device is included in a second signaling field among the plurality of signaling fields, and
   a binary value of the compression mode field represents whether the RU allocation information is included and size information relating to a number of subcarriers associated with an RU allocated to the at least one receiving device.

2. The baseband circuit of claim 1, wherein the number of subcarriers associated with the RU allocated to the at least one receiving device is 242 subcarriers, and when the RU allocation information is not included in the second signaling field, the binary value of the compression mode field is a first binary value,
   when the RU allocation information is included in the second signaling field, and a size of the RU allocated to the at least one receiving device is smaller than a 242-subcarrier RU, the binary value of the compression field is a second binary value different from the first binary value, and
   when the RU allocation information is included in the second signaling field, and the size of the RU allocated to the at least one receiving device is equal to or larger than the 242-subcarrier RU, the binary value of the compression mode field is a third binary value different from the first and second binary values.

3. The baseband circuit of claim 2, wherein, when the binary value of the compression mode field is the first binary value, data transmitted from the transmitting device to the at least one receiving device is transmitted via an entire frequency domain bandwidth of the data field.

4. The baseband circuit of claim 2, wherein, when the binary value of the compression mode field is the second value,
   at least one RU having a size smaller than the 242-subcarrier RU is arranged in a frequency domain of the data field based on the RU allocation information, and
   data transmitted from the transmitting device to each of the at least one receiving device is transmitted via any one RU among the at least one RU.

5. The baseband circuit of claim 4, wherein said any one RU is a single RU among a 26-subcarrier RU, a 52-subcarrier RU, and a 106-subcarrier RU, or any one multiple RU among a 26+52-subcarrier RU, a 52+26-subcarrier RU, a 26+106-subcarrier RU, and a 106+26-subcarrier RU.

6. The baseband circuit of claim 4, wherein multi-user (MU) multi-input multi-output (MIMO) is not applied to the at least one RU having a size smaller than the 242-subcarrier RU.

7. The baseband circuit of claim 4, wherein:
   the RU allocation information is included in an RU Allocation subfield in a common field of the second signaling field,
   the common field comprises common control information applied to the at least one receiving device, and
   a basic unit of the RU Allocation subfield corresponding to the frequency domain of the data field is 20 MHz.

8. The baseband circuit of claim 2, wherein, when the binary value of the compression mode field is the third value,
   at least one RU having a size equal to or larger than the 242-subcarrier RU is arranged in a frequency domain of the data field based on the RU allocation information, and
   data transmitted from the transmitting device to each of the at least one receiving device is transmitted via any one RU among the at least one RU.

9. The baseband circuit of claim 8, wherein said any one RU is a single RU among a 242-subcarrier RU, a 484-subcarrier RU, and a 996-subcarrier RU, or any one multiple RU among a 484+242-subcarrier RU, a 996+484-subcarrier RU, a 996+484+242-subcarrier RU, a 2×996+484-subcarrier RU, a 3×996-subcarrier, and a 3×996+484-subcarrier RU.

10. The baseband circuit of claim 8, wherein the MU MIMO is applied to at least one RU having a size equal to or larger than the 242-subcarrier RU.

11. The baseband circuit of claim 8, wherein:
the RU allocation information is included in an RU Allocation subfield in a common field of the second signaling field,
the common field comprises common control information applied to the at least one receiving device, and
a basic unit of the RU Allocation subfield corresponding to the frequency domain of the data field is 40 MHz or 80 MHz.

12. A baseband circuit in a receiving device of a wireless local area network (WLAN), the baseband circuit comprising:
a storage;
at least one processor coupled to the storage and configured to decode a physical layer convergence protocol (PLCP) protocol data unit (PPDU) transmitted from a transmitting device to the receiving device,
wherein,
the PPDU comprises a preamble and a payload,
the preamble comprises a plurality of training fields and a plurality of signaling fields,
the payload comprises a data field,
a first signaling field among the plurality of signaling fields comprises a compression mode field indicating whether resource unit (RU) allocation information designated for the receiving device is included in a second signaling field among the plurality of signaling fields, and
a binary value of the compression mode field represents whether the RU allocation information is included and size information relating to a number of subcarriers associated with an RU allocated to the receiving device.

13. The baseband circuit of claim 12, wherein:
when the RU allocation information is not included in the second signaling field, the binary value of the compression mode field is a first binary value,
when the RU allocation information is included in the second signaling field, and the size of the RU allocated to the receiving device is smaller than a 242-subcarrier RU, the binary value of the compression field is a second binary value different from the first value, and
when the RU allocation information is included in the second signaling field, and the size of the RU allocated to the receiving device is equal to or larger than the 242-subcarrier RU, the binary value of the compression mode field is a third binary value different from the first and second binary values.

14. The baseband circuit of claim 13, wherein, when the binary value of the compression mode field is the first binary value, data transmitted from the transmitting device to the receiving device is transmitted via an entire frequency domain bandwidth of the data field.

15. The baseband circuit of claim 13, wherein, when the binary value of the compression mode field indicates the second value,
at least one RU having a size smaller than the 242-subcarrier RU is arranged in a frequency domain of the data field based on the RU allocation information, and
data transmitted from the transmitting device to the receiving device is transmitted via any one RU among the at least one RU.

16. The baseband circuit of claim 15, wherein said any one RU is a single RU among a 26-subcarrier RU, a 52-subcarrier RU, and a 106-subcarrier RU, or any one multiple RU among a 26+52-subcarrier RU, a 52+26-subcarrier RU, a 26+106-subcarrier RU, and a 106+26-subcarrier RU.

17. The baseband circuit of claim 13, wherein, when the binary value of the compression mode field is the third binary value,
at least one RU having a size equal to or larger than the 242-subcarrier RU is arranged in the frequency domain of the data field based on the RU allocation information, and
data transmitted from the transmitting device to the receiving device is transmitted via any one RU among the at least one RU.

18. The baseband circuit of claim 17, wherein said any one RU is a single RU among a 242-subcarrier RU, a 484-subcarrier RU, and a 996-subcarrier RU, or any one multiple RU among a 484+242-subcarrier RU, a 996+484-subcarrier RU, a 996+484+242-subcarrier RU, a 2×996+484-subcarrier RU, a 3×996-subcarrier, and a 3×996+484-subcarrier RU.

19. A method of wirelessly communicating in a wireless local area network (WLAN), the method comprising:
generating, at a transmitting device, a physical layer convergence protocol (PLCP) protocol data unit (PPDU) comprising a preamble and a payload, wherein: (i) a first signaling field in the preamble includes a compression mode field indicating whether resource unit (RU) allocation information designated for at least one receiving device is included in a second signaling field in the preamble; and (ii) a binary value of the compression mode field represents whether the RU allocation information is included and, when the RU allocation information is included, size information relating to a number of subcarriers associated with an RU allocated to the at least one receiving device; and
transmitting the PPDU to the at least one receiving device.

20. The method of claim 19, wherein the size information represents that a size of the RU is less than a predetermined size, when the binary value is a first value, and represents that the size of the RU is the size information represents that the size of the RU equals or exceeds the predetermined size when the binary value is a second, different value.

21. The baseband circuit of claim 1, wherein when the number of subcarriers associated with the RU allocated to the at least one receiving device is less than a predetermined number, multi-user (MU) multi-input multi-output (MIMO) is not applied to the RU allocated to the at least one receiving device, and when the number of subcarriers equals or exceeds the predetermined number, MU MIMO is applied to the RU allocated to the at least one receiving device.

* * * * *